US010606595B2

(12) United States Patent
Ostby

(10) Patent No.: US 10,606,595 B2
(45) Date of Patent: Mar. 31, 2020

(54) DATA PROCESSING SYSTEMS

(71) Applicant: Arm Limited, Cambridge (GB)

(72) Inventor: Kenneth Edvard Ostby, Cambridge (GB)

(73) Assignee: Arm Limited, Cambridge (GB)

( * ) Notice: Subject to any disclaimer, the term of this patent is extended or adjusted under 35 U.S.C. 154(b) by 51 days.

(21) Appl. No.: 15/934,179

(22) Filed: Mar. 23, 2018

(65) Prior Publication Data

US 2019/0294439 A1 Sep. 26, 2019

(51) Int. Cl.
*G06F 9/30* (2018.01)
*G06T 1/20* (2006.01)
*G06F 9/38* (2018.01)

(52) U.S. Cl.
CPC ........ *G06F 9/3009* (2013.01); *G06F 9/30145* (2013.01); *G06F 9/3836* (2013.01); *G06T 1/20* (2013.01)

(58) Field of Classification Search
None
See application file for complete search history.

(56) References Cited

U.S. PATENT DOCUMENTS

| 5,179,702 | A | 1/1993 | Spix |
| 5,471,593 | A | 11/1995 | Branigin |
| 9,436,475 | B2 * | 9/2016 | Chakrabarti ............ G06F 9/38 |
| 9,672,035 | B2 * | 6/2017 | Pedersen ............ G06F 9/30036 |
| 2007/0255894 | A1 | 11/2007 | Hessel |
| 2010/0199257 | A1 | 8/2010 | Biggerstaff |
| 2013/0159668 | A1 | 6/2013 | Muff |
| 2014/0082328 | A1 | 3/2014 | Gopal |
| 2015/0205606 | A1 * | 7/2015 | Lindholm ............ G06F 9/3851 712/234 |
| 2017/0139757 | A1 * | 5/2017 | Mansell ................ G06F 9/3851 |
| 2017/0185406 | A1 * | 6/2017 | Lu ........................ G06F 9/30061 |

FOREIGN PATENT DOCUMENTS

| EP | 1873627 | 1/2008 |
| GB | 2409064 | 6/2005 |
| WO | 2006/007193 | 1/2006 |

OTHER PUBLICATIONS

Brunie, N. etal., Simultaneous Branch and Warp Interweaving for Sustained GPU Performance, 2012, IEEE, pp. 49-60. (Year: 2012).*
Gebhart, M., etal., Energy-efficient Mechanisms for Managing Thread Context in Throughput Processors, 2011 ACM pp. 235-246. (Year: 2011).*
Search Report for GB 1 320 854.1 dated Apr. 24, 2014.

* cited by examiner

*Primary Examiner* — Eric Coleman
(74) *Attorney, Agent, or Firm* — Vierra Magen Marcus LLP

(57) ABSTRACT

A data processor in which execution threads may be grouped together into thread groups in which the plural threads of a thread group can each execute a set of instructions in lockstep, one instruction at a time. The data processor comprises a plurality of execution lanes for executing respective execution threads of a thread group. For each thread group in a pool 51 of thread groups available to be issued to the execution lanes, an indication 54 of the active threads of the thread group is stored, and sets of at least one thread group from the pool 51 of available thread groups to issue 73 to the execution lanes for execution are selected 72 based on the indications of the active threads for the thread groups in the thread group pool.

19 Claims, 11 Drawing Sheets

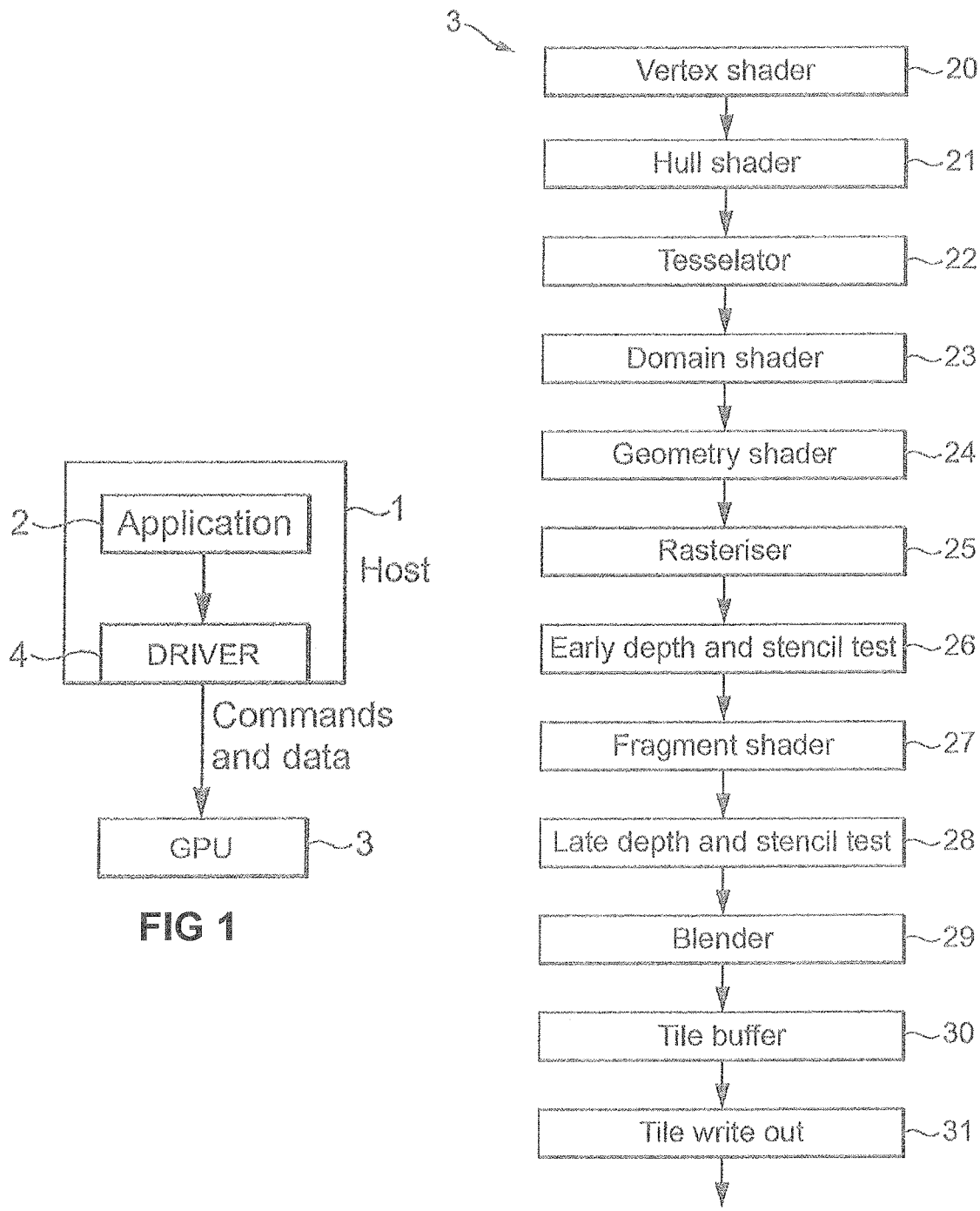

DATA PROCESSING SYSTEMS

BACKGROUND

The technology described herein relates generally to the operation of data processing systems that include programmable processing stages, such as a graphics processing system that includes one or more programmable processing stages ("shaders").

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of: a geometry shader, a vertex shader, and a fragment (pixel) shader. These shaders are programmable processing stages that execute shader programs on input data values to generate a desire set of output data, for example appropriately shaded and rendered fragment data in the case of a fragment shader, for processing by the rest of the graphics pipeline and/or for output. The shaders of the graphics processing pipeline may share programmable processing circuitry, or they may each be executed by distinct programmable processing units.

A graphics processing unit (GPU) shader core is thus a processing unit that performs graphics processing by running small programs for each graphics "work" item in a graphics output, such as a render target, e.g. frame, to be generated (an "item" in this regard is usually a vertex or a sampling position (e.g. in the case of a fragment shader)). This generally enables a high degree of parallelism, in that a typical render output, e.g. frame, features a rather large number of vertices and fragments, each of which can be processed independently.

In graphics shader operation, each work "item" will be processed by means of an execution thread which will execute the instructions of the shader program in question for the graphics work "item" in question.

The actual data processing operations that are performed by the shader program will be performed by respective functional units, such as arithmetic units, of the graphics processor, in response to, and under the control of, the instructions in the shader program being executed. Thus, for example, appropriate functional units, such as arithmetic units, will perform data processing operations in response to and as required by instructions in a shader program being executed. Typically, there will be a plurality of functional units provided in a graphics processor (GPU), each of which can be respectively and appropriately activated and used for an execution thread when executing a shader program.

The functional units provided in a graphics processor for the purpose of performing operations required by shader programs (and otherwise) may be (and are typically) shared between different shaders (shader stages) of the graphics processing pipeline being executed by the graphics processor. Thus, there will typically be a set of functional units arranged for, and usable for, the execution of shader programs. It would also be possible to provide separate functional units for separate shaders (or for some functional units to be separate and for some to be shared), as desired.

Shader program execution efficiency may be improved by grouping execution threads (where each thread corresponds, e.g., to one vertex or one sampling position) into "groups" or "bundles" of threads, where the threads of one group are run in lockstep, one instruction at a time. In this way, it is possible to share instruction fetch and scheduling resources between all the threads in the group. Other terms used for such thread groups include "warps" and "wave fronts". For convenience, the term "thread group" will be used herein, but this is intended to encompass all equivalent terms and arrangements, unless otherwise indicated.

In a system where execution threads can be grouped into thread groups, then the functional units for performing the processing operations in response to the instructions in a shader program are normally correspondingly operable so as to facilitate such thread group arrangements. For example, a functional unit may be arranged as respective execution lanes, one for each thread that a thread group may contain (such that, for example, for a system in which execution threads are grouped into groups (warps) of four threads, the functional units may each be operable as four respective (and identical) execution lanes), so that the functional unit can execute the same instruction in parallel for each thread of a thread group.

The Applicants believe that there remains scope for improvements to the handling of thread groups, particularly for shaders of graphics processing pipelines.

BRIEF DESCRIPTION OF THE DRAWINGS

A number of embodiments of the technology described herein will now be described by way of example only and with reference to the accompanying drawings, in which:

FIG. 1 shows an exemplary graphics processing system;

FIG. 2 shows schematically a graphics processing pipeline that can be operated in the manner of the technology described herein;

Like reference numerals are used for like components where appropriate in the drawings.

DETAILED DESCRIPTION

Figure 3:
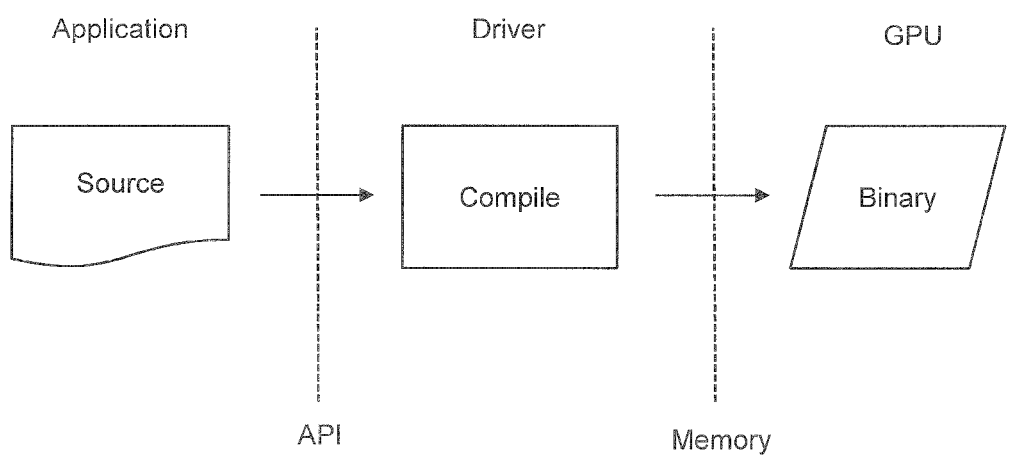
FIG. 3 shows schematically the compiling of a shader program for execution by a graphics processing pipeline.

A first embodiment of the technology described herein comprises a data processor in which execution threads may execute program instructions to perform data processing operations and in which execution threads may be grouped together into thread groups in which the plural threads of a thread group can each execute a set of instructions in lockstep, one instruction at a time;

the data processor comprising:

execution processing circuitry operable to execute instructions to perform processing operations for execution threads executing a program to perform data processing operations and comprising a set of at least one functional unit operable to perform data processing operations for an instruction being executed by an execution thread;

wherein:

the execution processing circuitry is operable as a plurality of execution lanes, each lane being operable to perform processing operations for a respective execution thread of a thread group;

the data processor further comprising:

thread group managing circuitry operable to maintain a pool of thread groups available to be issued to the execution lanes, and storing for each available thread group: an indication of a set of at least one next instruction to be executed by the thread group, and an indication of the active threads of the thread group;

and thread group selection circuitry operable to select thread groups from the pool of available thread groups and to issue the selected thread groups from the pool of available thread groups to the execution lanes for execution;

wherein:

the thread group selection circuitry is configured to select a set of at least one thread group to issue to the execution lanes for execution based on the indications of the active threads for the thread groups in the thread group pool.

A second embodiment of the technology described herein comprises a method of operating a data processor in which execution threads may execute program instructions to perform data processing operations and in which execution threads may be grouped together into thread groups in which the plural threads of a thread group can each execute a set of instructions in lockstep, one instruction at a time;

the data processor comprising:

execution processing circuitry operable to execute instructions to perform processing operations for execution threads executing a program to perform data processing operations and comprising a set of at least one functional unit operable to perform data processing operations for an instruction being executed by an execution thread;

wherein:

the execution processing circuitry is operable as a plurality of execution lanes, each lane being operable to perform processing operations for a respective execution thread of a thread group;

the method comprising:

maintaining a pool of thread groups available to be issued to the execution lanes, and storing for each available thread group: an indication of a set of at least one next instruction to be executed by the thread group, and an indication of the active threads of the thread group;

selecting a set of at least one thread group to issue to the execution lanes for execution from the pool of available thread groups based on the indications of the active threads for the thread groups in the thread group pool; and issuing the selected set of at least one thread group from the pool of available thread groups to the execution lanes for execution.

The technology described herein relates to data processors, such as graphics processors, which can execute execution threads to execute a set of instructions for programs to perform data processing operations, and in which threads that are to execute the instructions of a program may be grouped together into a thread group ("warp"). The data processor is further provided with a plurality of execution lanes, such that each thread of a thread group can be executed using a respective execution lane in parallel.

However, in the technology described herein, rather than simply issuing the next thread group that is ready to the execution lanes for execution when executing a program on the data processor, a pool of thread groups available to be issued to the execution lanes is maintained, and then the next thread group or groups to issue to the execution lanes for execution from the thread group pool is selected based (at least) on which threads of the thread groups in the thread group pool are indicated as being "active". As will be discussed further below, this can then facilitate executing two (or more) thread groups simultaneously using the execution lanes, and/or executing two (or more) different instructions for a thread group simultaneously using the execution lanes (depending, e.g., upon the exact configuration of the execution lanes and their associated control circuitry (as will be discussed further below)).

The Applicants have recognised in this regard that in data processing systems that group execution threads executing program instructions together into thread groups of plural execution threads, it can be the case that not all the threads of a given thread group will be "active" (e.g. needed or used to process data that is required for the data processing operation being performed), but rather a thread or threads of a thread group may be "inactive" (i.e. will not have any impact on the output results (so, e.g., will not cause any changes to the register file or any other side effect to the system)).

For example, in the case of fragment shading on a graphics processor, in which respective thread groups, e.g., correspond to respective pixels and process a set of sampling points associated with a pixel, it may be the case that not all the sampling points for a pixel are covered by a primitive, such that the threads of a thread group corresponding to the uncovered sampling points will not in practice be needed or used to process the primitive in question (and so may be considered to be "inactive"). It can also be that certain program instructions, such as branching instructions in a program being executed, may cause one or more threads of a thread group to become inactive.

The Applicants have also previously proposed in their U.S. patent applications No. 15/346931 and U.S. Ser. No. 15/657,014 (the contents of which are incorporated herein in their entirety) mechanisms for, in effect, reducing or avoiding processing to be performed by one or more threads of a thread group (such that those threads may be completely or at least partially "inactivated").

While it would be possible simply to "disable" the operation of an execution lane for any inactive threads of a thread group (which may then reduce power consumption, for example), the Applicants have recognised that the throughput of execution of thread groups could be increased if it were possible to use execution lanes that would otherwise be allocated to inactive threads of a thread group to process active threads of other thread groups and/or to process other instructions of the same thread group instead.

As will be discussed further below, the technology described herein facilitates this operation by maintaining a pool of thread groups available for execution and selecting thread groups for issuing to the execution lanes from the pool based on the active threads of the thread groups in the pool.

This then facilitates, for example, issuing plural thread groups simultaneously to the execution lanes (such that plural thread groups will be executed at the same time by the execution lanes), thereby, e.g., increasing the throughput of the thread groups relative to an arrangement in which, for example, only a single thread group is issued to the execution lanes at any one time. (In other words, the execution of different thread groups can, in effect, be merged within the execution lanes, such that the execution lanes will be occupied by more than one thread group at the same time, thereby increasing the throughput of thread groups through the execution lanes.)

Additionally or alternatively, and again as will be discussed further below, the technology described herein can be used to allow plural different instructions to be executed for active threads of the same thread group at the same time (i.e. to, in effect, allow a given thread group to issue multiple instructions to the execution lanes at the same time), thereby, e.g., increasing the instruction execution throughput for the thread group in question.

The data processor can be any desired and suitable data processor in which execution threads can be processed together in thread groups. In general the data processor is in an embodiment a data processor that can perform vector (SIMD (single instruction multiple data)) processing, such as a graphics processor, a vector processor, a DSP or a CPU (when performing SIMD processing). In an embodiment, the data processor is a graphics processor (graphics processing unit (GPU)).

The operation in the manner of the technology described herein may be performed for any suitable and desired program that is to be executed by the data processor. In the case of a graphics processor, the program may be, and is in an embodiment, a (graphics) shader program. The program may be, for example, a geometry shader program (a program for executing geometry shading operations), a vertex shader program (a program for executing vertex shading operations), or a fragment shader program (a program for executing fragment shading operations).

The program will comprise a sequence of instructions to be executed by the executions threads. The set (sequence) of instructions being executed for the program can be any desired and suitable instructions that would typically be executed by plural threads. The program instructions may comprise, for example, one or more or all of: arithmetic (mathematical) operations (add, subtract, multiply, divide, etc.), bit manipulations (invert, swap, shift, etc.); logic operations (AND, OR, NAND, NOR, NOT, XOR, etc.); load-type instructions (such as varying, texturing or load instructions in the case of graphics processing); and store-type instructions (such as blend or store instructions).

In an embodiment, the technology described herein is used for and when the data processor (the execution processing circuitry of the data processor) is executing a (programmable) processing stage of a data processing pipeline. In this case therefore, the execution processing circuitry will be executing a program (a set of instructions) to perform processing operations of a (programmable) processing stage of a data processing pipeline, with thread groups being issued to the execution processing circuitry to execute the (programmable) processing stage in the manner of the technology described herein.

The operation in the manner of the technology described herein can be, and is in an embodiment, used for plural processing stages of a data processing pipeline (where the pipeline comprises plural programmable processing stages). In an embodiment the operation in the manner of the technology described herein is used for all (programmable) processing stages that the data processor, e.g. graphics processor, may be required to execute.

The processing stage can comprise any suitable and desired (programmable) processing stage of a data processing pipeline.

In an embodiment, the processing stage is a programmable processing stage of a graphics processing pipeline. In this case, the processing stage in an embodiment comprises a programmable shading stage (shader). The programmable processing stage that the program is executing may, for example, be a geometry shading stage (geometry shader), a vertex shading stage (vertex shader), or a fragment shading stage (fragment shader).

The operation in the manner of the technology described herein may be performed by and for each and every program and/or (programmable) processing stage that the data processor executes, or only for particular categories or types of program or processing stage but not for other categories or types of program or processing stage (e.g. where the type of program or processing stage is unlikely to offer useful opportunities to "merge" different thread groups in the execution lanes).

The groups of plural threads (the thread groups) that the execution threads executing the program are grouped into can be any suitable and desired size. The thread groups are in an embodiment all the same size (at least for a given instance of a program execution). In an embodiment there is a fixed thread group size that the data processor supports. The thread groups may contain, e.g. four threads (i.e. there is a "warp width" of four), or wider thread groups (warps) would be possible, if desired.

Each execution thread and/or thread group can relate to any suitable and/or desired "work" item that the program in question is to be executed for. For example, in the case of a graphics processor, each thread may correspond to a vertex or a sampling position, with the thread groups corresponding to appropriate sets of plural vertices or sampling positions. For example, each thread group (warp) may correspond to a graphics fragment, with each thread in the thread group then corresponding to a respective sampling position that the fragment represents. For example, each thread group could correspond to a 2×2 sampling position "quad" that is to be processed through a graphics processing pipeline.

The execution processing circuitry that executes instructions for the execution threads may be operable and arranged as any desired (plural) number of execution lanes. In an embodiment, there are as many execution lanes as the (maximum) number of threads that may be included in a thread group (although other arrangements would be possible, if desired). Thus, in an embodiment, each thread group comprises a particular number of threads, and the execution processing circuitry comprises (in an embodiment exactly) that particular number of execution lanes. Thus in the case where each thread group contains four threads, there are in an embodiment four (and in an embodiment only four) execution lanes.

Each execution lane is operable to perform processing operations for a respective execution thread of a thread group, and is provided by one or more functional units operable to perform data processing operations for an instruction being executed by an execution thread. Each functional unit should be, and in an embodiment is, able to process as many threads in parallel as there are execution lanes (so each functional unit will comprise a set of plural execution lanes).

Depending on the processing required, a given thread group could be processed by a single functional unit only, or by a plurality of functional units. Thus each execution lane could comprise overall only a single functional unit, or could comprise plural functional units (and in an embodiment this is the case). Each execution lane should, and in an embodiment does, comprise overall the same functional unit or units as the other execution lanes (so that each execution lane can operate in the same manner in respect of a thread). Where each execution lane comprises plural functional units overall, then the execution threads could be issued to the functional units effectively as a whole (as a single set of plural functional units) or different (e.g. each) functional units making up the overall execution lane could be treated independently, such that individual functional units could, e.g., have their own thread group selection and issuing circuitry, with execution threads being issued to the functional units independently of other functional units.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store-type units (such as blend or store units), etc. In an embodiment the functional units (at least) comprise arithmetic units (i.e. units operable to perform arithmetic (mathematical) operations).

The functional units can be implemented as desired and in any suitable manner. They will comprise (be implemented as) suitable hardware elements such as processing circuitry (logic).

The data processor in an embodiment also comprises appropriate control circuitry (control logic) for controlling the execution lanes (the functional units operating as the execution lanes) to cause them to perform the desired and appropriate processing operations.

This can be done using any suitable and desired control circuitry. In an embodiment, this control circuitry comprises instruction decode circuitry that is operable to decode an instruction to be executed for a thread so as to cause the execution lane to execute the required instructions.

Such instruction decode circuitry could be provided for all the execution lanes collectively (i.e. such that there would be one set of instruction decode circuitry that is operable to decode an instruction that is then to be executed by all of the execution lanes) (and in one embodiment this is the case). In this case, all the execution lanes would execute the same instruction (at any one time (in a given cycle)).

Thus, in one embodiment, a single set of instruction decode circuitry is provided that is operable to decode an instruction for all of the execution lanes collectively, such that all the execution lanes will execute the same instruction at any one time (in a given cycle).

Alternatively, plural separate sets of instruction decode circuitry could be provided, e.g. one for each execution lane, or for respective groupings (subsets) of the execution lanes. For example, the execution lanes could be divided into plural (e.g. two), e.g., and in an embodiment, equal, subsets (partitions), with each subset (partition) comprising an appropriate number of the execution lanes, and with each subset being provided with its own, respective, instruction decoding circuitry. This would then allow the respective subsets that the execution lanes are divided into to execute different instructions at the same time (in the same cycle) (but with the execution lanes within a given subset executing the same instruction). This will further facilitate using the plural execution lanes more flexibly when there are thread groups with inactive threads.

Each subset could comprise, e.g., one or two execution lanes.

Thus, in another embodiment, the data processor comprises plural sets of instruction decode circuitry, such that different instructions can be provided to and executed by different execution lanes at the same time (in a given cycle). In this case, there is in an embodiment a respective set of instruction decode circuitry provided for each of plural subsets of the execution lanes (with each subset comprising one or more, and in an embodiment an equal number of, the execution lanes). In this case therefore, the execution lanes will be divided into plural partitions, with each partition being able to execute its own respective instruction in the same (clock) cycle.

The thread group managing circuitry can maintain the pool of thread groups available to be issued to the execution lanes in any suitable and desired manner. In an embodiment, this is done by maintaining a table of thread groups available to be issued to the execution lanes. The thread group pool (data), e.g. table, may be stored in any suitable and desired storage of or accessible to the data processor. It is in an embodiment stored locally to the execution processing circuitry, such as in registers of or associated with (and accessible to) the execution processing circuitry of the data processor. The thread group pool (data) may be maintained, e.g., in the form of a scoreboard or as a reserve station, or in any other suitable and desired manner.

The thread groups for adding to the pool will be provided by an appropriate thread group generator and scheduler of the data processor, that generates thread groups for execution. This may depend, for example, upon what "work items" the threads and thread groups represent. For example where threads correspond to pixels/sampling points, there will be a rasterisation step/stage which generates the threads. For vertex shading or graphics compute processing, there will be an appropriate vertex processing/compute processing stage that, e.g., generates the threads and thread groups. Other arrangements would, of course, be possible.

The thread group managing circuitry stores, e.g., and in an embodiment, in a thread group pool table, an indication of a set of at least one next instruction to be executed by the thread group in question, an indication of the active threads of the thread group in question, and an indication of data to be processed for each thread of the thread group in question.

The indication of a set of at least one next instruction to be executed by the thread group can be provided in a suitable and desired manner. The next instruction indicator in an embodiment indicates (allows to be determined) the next instruction or instructions in the program (sequence of instructions) being executed that should be executed. In an embodiment, it comprises a pointer or pointers to the next instruction or instructions to be executed. In an embodiment, the pointer(s) is the form of a program count (PC).

The indication of a set of at least one next instruction to be executed by the thread group could indicate a single (i.e. the next) instruction to be executed only. However, in an embodiment it indicates a set of plural instructions to be executed next (i.e. the next N instructions in the sequence of instructions to be executed by the thread group). In this case, the next instruction indication in an embodiment indicates a set of a few instructions, such as, and in an embodiment, the next two to four, in an embodiment two or four, instructions to be executed. The number of next instructions to be executed that are indicated may, e.g., and in an embodiment, depend upon the size of (and be a function of) the instruction cache bandwidth, i.e. how many instructions can be fetched from the instruction cache in one request. In an embodiment, indication is of a set of next instructions corresponding to the instruction cache bandwidth (i.e. the number of instructions that can be read from the instruction cache in one request).

Other arrangements would, of course, be possible.

The indication of the active threads for a thread group can take any suitable and desired form. In an embodiment, it indicates for each thread of the group, whether that thread is active or not. Thus it may, and in an embodiment does, comprise a bitmap corresponding to the number of threads (and their positions (their respective execution lanes)) within the thread group, with the bits for each thread in the bitmap being set appropriately to indicate whether that thread (lane) is active or not.

The identification of threads of a thread group as being active or inactive can be achieved in any suitable and desired manner. In an embodiment appropriate, e.g. state, information is maintained to track and indicate which thread or threads of a thread group are active, which threads of the thread group are inactive (disabled). This tracking information can be maintained in any suitable and desired manner, for example in an appropriate state table.

In an embodiment, the thread group managing circuitry also stores, for each thread group in the pool of the thread groups, an indication of data to be processed for each thread of the thread group.

The indication of the data to be processed for each thread of the thread group can be provided in any suitable and desired manner. In an embodiment, a separate indication of the data to be processed is stored for each thread of the thread group. This indication in an embodiment indicates the data that the thread will be fetching, e.g. and in an embodiment, from the register file, for processing with the next instruction or instructions to be executed for the thread group.

Other arrangements would, of course, be possible.

In an embodiment, the thread group managing circuitry also stores, for each thread group in the pool of the thread groups, an identifier for the thread group (that at least uniquely identifies the thread group within the pool). This identifier is in an embodiment stored in association with the other stored information for a thread group (i.e. the next instruction indication, the active threads indication and the thread data indications). This then allows the different thread groups to be identified and, as will be discussed further below, tracked through the execution lanes.

The thread group selection circuitry may select a set of at least one thread group to issue to the execution lanes for execution based on the indications of the active threads for the thread groups in the thread group pool in any suitable and desired manner.

In an embodiment, both sets containing single thread groups and sets containing plural thread groups can be selected for issue to the execution lanes.

In an embodiment, the thread group selection circuitry is operable to (and the method comprises) identify thread groups in the thread group pool that include at least one inactive thread, and to select a set of at least one thread group to issue to the execution lanes for execution from a thread group or groups in the thread group pool having an inactive thread or threads.

In an embodiment, the thread group selection circuitry is operable to (and the method comprises) (try to) identify plural thread groups each having at least one inactive thread, so as to try to combine plural thread groups each having an inactive thread or threads into a set of plural thread groups for issuing to the execution lanes for execution at the same time (in the same cycle).

In an embodiment, the thread group selection circuitry is operable to (and configured to) (and the method of the technology described herein comprises) identify a set of two or more thread groups for which not all of the threads in each of the thread groups are active, and which may accordingly be combined (merged) into a set of two or more thread groups that can be issued to the execution lanes for execution at the same time (in the same cycle). In this case, the thread group selection circuitry (and method) could try to identify pairs of thread groups, each having inactive threads, that could be bundled together for issue to the execution lanes at the same time, or could be operable to identify any plural number of thread groups that could be so-combined.

Thus, a (and each) set of thread groups that may be combined and issued to the execution lanes at the same time in one embodiment may contain a maximum of two thread groups only (i.e. pairs of thread groups that may be combined into thread group sets are identified). However, it would also or instead be possible to identify sets of three or more thread groups that may be combined into a thread group set, if desired.

These arrangements will facilitate issuing plural different thread groups to the execution lanes for execution at the same time (based on the inactive threads of the thread groups), thereby increasing the throughput of the thread groups through the execution lanes.

In these embodiments, the thread groups that are combined in a set (bundle) of thread groups to be issued to the execution lanes at the same time should each have at least one inactive thread, but can otherwise be selected as desired.

The thread groups to be (potentially) combined into a set of plural thread groups that is issued to the execution lanes for execution at the same time (in the same cycle) in an embodiment total between them no more than the number of execution lanes that the execution processing circuitry has (e.g., in practice, and in an embodiment, total no more than the maximum number of active threads that a single thread group can contain), as that then allows all the active threads for the thread groups to be executed at the same time by the execution processing circuitry (by the execution lanes). In an embodiment, thread groups that will combine to provide a "full" combined thread group set (i.e. a thread group set that will use all of the execution lanes) are in an embodiment (and preferentially) identified as thread group combining candidates (and accordingly selected as sets of thread groups for issue as a set to the execution lanes).

In an embodiment, thread groups having non-overlapping active threads (i.e. for which the active threads reside in different thread group (warp) lanes) are identified as being thread groups that can be bundled together for simultaneous issue to the execution lanes for execution.

In one embodiment, only thread groups having non-overlapping active threads (lanes) are identified as being thread groups that can be combined for issue to the execution lanes at the same time (and are accordingly selected as being thread groups that can be combined for issue to the execution lanes at the same time).

In another embodiment, it is possible to remap the allocation of the threads to thread group lanes for thread groups, so as to (try to) remove the overlap for thread groups that in their initial configuration have overlapping active threads (lanes). This would then allow initially overlapping thread groups to be (potentially) bundled together for issue to the execution lanes at the same time.

Thus, in an embodiment, the data processor, and in an embodiment the thread group managing circuitry, is able to (and the method comprises) remap the association (distribution) of active threads of a thread group to the thread group execution (warp) lanes, so as to, for example, and in an embodiment, be able to remove active thread execution (warp) lane overlap between different thread groups. This may be done, for example, by shifting data between threads for a thread group (and accordingly modifying the active threads information (e.g. bit mask) for a thread group).

In this case, in an embodiment, the remapping (redistribution) for a remapped thread group is tracked or otherwise recorded in some way so as to allow the data processing operation to still ensure that any operations performed on a "remapped" thread group are performed correctly, and to allow the final results for the remapped thread group to be "unmapped" as needed, e.g. when they are to be committed to an output.

In another embodiment, it is possible to identify opportunities to (and to) reduce the number of active threads for a thread group, so as to, for example, and in an embodiment, allow the number of active threads for a thread group or group of thread groups to be reduced so as to allow thread groups then to "fit into" the available execution lanes. This could be done, for example, where threads in a given thread group are in fact processing the same input data (such that the threads processing the same input data could be, in effect, merged into (processed as) a single thread), and/or where threads in different thread groups are processing the same input data (and performing the same processing operations on that input data). Again, this may be done, for example, by shifting data between threads for a thread group (and accordingly modifying the active threads information (e.g. bit mask) for a thread group). This would further facilitate combining different thread groups for issue as a set simultaneously to the execution lanes for execution.

The process of identifying thread groups having inactive threads that can be bundled (grouped) together for issue to the execution lanes for execution at the same time can be performed in any suitable and desired manner. For example, a thread group having one or more inactive threads could be identified, and then any appropriate further thread group or groups having inactive threads that could be combined with that first thread group could be searched for in the thread group pool (e.g. until a thread group that can be combined with the first thread group is identified).

Alternatively, more sophisticated searching and selection processes could be used. For example, the thread group selection circuitry could be operable to analyse all the thread groups in the thread group pool and to select therefrom appropriate sets of plural thread groups that can be combined together for issue to the execution lanes for execution at the same time.

Other arrangements would, of course, be possible.

In an embodiment, the thread group selection circuitry and the thread group selection process also takes account of (and is based on) the next instruction or instructions (where a set of more than one next instruction to be executed for a thread group is maintained) indicated for the thread groups in the thread group pool.

Thus, in an embodiment, the thread group selection circuitry is configured to (and the process operates to) select a thread group or groups to issue to the execution lanes for execution based on the indications of the active threads for the thread groups in the thread group pool and on the indications of a set of at least one next instruction to be executed for the thread groups in the thread group pool.

In one embodiment, the selection process is configured such that only thread groups that are to execute the same next instruction can be (and are) combined to form a set of at least one thread group that is issued to the execution lanes for execution at the same time (in the same cycle). In this case, thread groups having matching instructions (and, e.g., non-overlapping active threads) would be able to be combined into a set of plural thread groups for issuing to the execution lanes for execution at the same time. This may be necessary where, for example, the execution lanes all share the same, single instruction decode circuitry, such that all the execution lanes are constrained to always have to each execute the same instruction at the same time.

However, the Applicants have recognised that in the case where different execution lanes (or subsets of the execution lanes) can execute different instructions at the same time (in the same cycle), e.g., because, as discussed above, there is respective instruction decode circuitry provided for each of plural different subsets of the execution lanes, then there does not in practice need to be a requirement that all the execution lanes execute the same instruction at any given time, but rather the requirement may be, and is in an embodiment, that each respective subset (partition) of the execution lanes is executing the same instruction. In this case therefore, thread groups executing as many different instructions as different subsets (partitions) of execution lanes that are provided could be combined together in a single thread group set.

Thus, in another embodiment, the arrangement is such that different thread groups executing different "next" instructions can be combined into a single thread group set that will be issued to the execute lanes for execution at the same time (in a single cycle). In this case, in an embodiment the arrangement is such that each of respective subsets (partitions) of the execution lanes can only include threads and thread groups executing the same instruction, but the different execution lane subsets (partitions) can be executing different instructions (include threads and thread groups that are executing different instructions to the other execution lane subsets (partitions)).

In these arrangements, the (maximum) number of different instructions that can be executed in a given cycle (and thus the number of different instructions that the thread groups that are bundled together can be executing) will, and in an embodiment does, correspond to (match) the number of different subsets (partitions) that the execution lanes have been divided into. (As will be appreciated by those skilled in the art, in these arrangements it is not necessary for each execution lane subset (partition) to be executing a different instruction, but the arrangement allows that to happen, and so the thread group selection process in an embodiment takes account of that.)

Correspondingly in these arrangements, if a single thread group has enough active threads such that it will execute over multiple execution lane subsets (partitions), then that thread group can, in an embodiment is, simply issued to plural execution lane subsets (partitions).

These arrangements will facilitate increasing the thread group throughput, as it will allow thread groups executing different instructions to be issued together in the same thread group set (in contrast to an arrangement where all the thread groups included in a thread group set have to be executing the same instruction).

In the case where thread groups having matching instructions are to be identified (e.g. whether for all the execution lanes, or for a subset (partition) of the execution lanes), then that can be done in any suitable and desired manner. For example, the next instruction for a given thread group in the thread group pool could be identified, and then the thread group pool searched for another (or other) thread groups having the same instruction, to try to identify another thread group in the thread group pool that could be combined with the first thread group.

Additionally or alternatively, a more sophisticated search of the thread group pool could be used, for example to sort all of the thread groups in the thread group pool into subsets based on their indicated instructions to be executed (with each subset containing thread groups that are all to execute the same instruction), with appropriate thread group combinations then being selected from the identified subsets of thread groups. This could be done in any suitable and desired manner, for example by grouping all the indicated instructions for the thread groups in the thread group pool into a set of unique instructions, and then finding the subsets of thread groups executing each unique instruction in the set of unique instructions.

Other arrangements would, of course, be possible.

Whether the next instructions to be executed for different thread groups are the same (match) or not can be determined in any suitable and desired manner. For example, it could be done simply by comparing an indication of the next instruction (the next instruction pointer) (e.g. current program count (PC)) for the thread groups in question to see if they are the same or not. Alternatively or additionally, the actual instructions to be executed could be compared. This latter approach may allow more matching instructions to be identified, as it will also identify matches in those situations where thread groups have different current instruction pointers (PCs) but are in fact both executing the same instruction.

Thus, in an embodiment, the thread group selection circuitry operates to and the method comprises, selecting a set of a plurality of different thread groups to issue to the execution lanes for execution next, based on the indications of the active threads for the thread groups in the thread group pool. In one embodiment, the thread groups to issue to the execution lanes next are also selected based on the next instructions that the thread groups will execute, e.g., in one embodiment such that the thread groups selected to issue to the execution lanes next are all to execute the same instruction, but in another embodiment such that at least two of the plural thread groups selected to issue to the execution lanes next are to execute different instructions.

The Applicants have also recognised that where the execution processing circuitry of the data processor is configured such that different subsets of the execution lanes can execute different instructions at the same time (in the same cycle), then as well as, as discussed above, being able to send different thread groups executing different instructions to the different subsets of the execution lanes at the same time, it would also be possible to execute different instructions for the same thread group on different subsets of the execution lanes at the same time (in the case where the active threads of the thread group will occupy less than all the execution lane subsets).

In this case, the thread group selection circuitry could select a single thread group to issue to the execution lanes for execution next, but operate to send the active threads for the thread group to one (or more) subset of the execution lanes in association with a first instruction to be executed for the thread group, and the same active threads of the thread group to a second subset (or subsets) of the execution lanes in association with (i.e. to execute) a different instruction for the thread group. This operation can, in effect, facilitate the data processor (and the execution processing circuitry of the data processor) acting in a "superscalar" manner for a thread group, i.e. simultaneously despatching and executing multiple instructions for the same thread group at the same time (during a single clock cycle) (in parallel).

This could also be done in combination with further thread groups, e.g. where the thread groups can each be sent to a different execution lane subset.

This would in particular be possible where the indication of a next set of at least one instruction to be executed by a thread group stores an indication of more than one next instruction to be executed by the thread group, so that the thread group selection circuitry can identify the two or more different instructions for the thread group to be distributed to the different subsets of the execution lanes.

Thus, in an embodiment, the set of at least one thread group to issue to the execution lanes for execution may (and does) contain a single thread group.

In an embodiment, the thread group selection can operate to (and operates to) select a thread group to issue to the execution lanes for execution that has at least one inactive thread, but is configured to cause the execution lanes to cause plural (e.g. two) instructions to be executed (for the active threads) of that thread group.

In these arrangements, each different instruction to be executed for the thread group should be, and is in an embodiment, issued to a different subset of the execution lanes, and the same active threads of the thread group should be, and are in an embodiment, issued to each respective subset of the execution lanes that is being used to execute a different instruction for the thread group.

Thus, in an embodiment, the thread group selection circuitry and process can operate to (and operates to) select a set of at least one thread group to issue to the execution lanes for execution that comprises duplicate copies of (the active threads of) a given (the same) thread group, and operates to cause the execution lanes to execute a different instruction for each copy of the thread group that is included in the set of at least one thread group that is issued to the execution lanes for execution at the same time (in the same cycle). In this case, the set of at least one thread group could simply comprise plural copies of the (active threads (lanes) of the) same, single thread group, or it could comprise plural copies of a particular thread group or groups together with another thread group or groups (whether as a single copy or as duplicate copies), e.g. depending upon the different subsets that the execution lanes have been divided into (and thus the number of different instructions that the execution lanes can support).

Where the thread group selection circuitry and process is able to issue different instructions for the same thread group to different subsets of the execution lanes at the same time, then in an embodiment, that process and operation is constrained so as to avoid issuing two (or more) instructions that have a dependency between them (e.g. one instruction being dependent on the result of the other instruction) to the execution lanes for a thread group at the same time. This will then help the operation in this manner to avoid data hazards when issuing multiple instructions for the same thread group to the execution lanes at the same time.

Such instruction dependency could be determined as desired. For example, the thread group selection circuitry could be operable to determine if there is any dependency between different instructions indicated for a thread group in the thread group pool. Alternatively or additionally, the compiler (the compilation process) for the program being executed could be configured to include with and/or associate with the instructions for the program indications (hints) of whether instructions have dependencies (and, e.g. the form of the dependency) or not. The thread group selection circuitry could then be configured to use any dependency indications provided or associated with the instructions when determining whether to issue two or more instructions for a thread group to the execution lanes at the same time.

The thread group selection circuitry and process could also (and in an embodiment does also) take account of one or more other factors when selecting a next thread group (or groups) to issue to the execution lanes for execution.

For example, in the case where the thread group selection circuitry and process is operable to select plural thread groups for issuing to the execution lanes for execution in a single set (at the same time), the arrangement could be, and in an embodiment is, such that only thread groups that go to different register file banks can be combined into a set of plural thread groups for issuing to the execution lanes for execution at the same time (in the same cycle). This would help to avoid, for example, plural thread groups wanting to write to different addresses in the same physical RAM in the same cycle.

Thus, the thread group selection process may be, and in an embodiment is, configured to operate in a manner that is appropriate to and consistent with any restrictions for the handling of thread groups and/or thread group data (for example) in the data processor, such as, and in an embodiment, in dependence on the register file layout being used. Thus, for example, where there are plural different register and/or memory banks available for the use of the thread groups, the thread group selection process may be configured to operate in a suitable manner given that arrangement.

In one embodiment, it is possible for only some but not all of the active lanes of a thread group having inactive threads to be included in a set of plural thread groups that is issued to the execution lanes for execution at the same time. In this case, the thread group will, in effect, "partially" join the set of thread groups that is being issued to the execution lanes for execution. The remaining active threads of the thread group could then, e.g., be included with ("partially join") one or more other thread groups in a later thread group set or sets, as desired and appropriate (or could, e.g., simply be issued alone to the execution lanes for execution, if necessary).

In another embodiment, the thread group selection process is configured such that thread groups cannot be only partially (only in part) included in a set of plural thread groups that is being issued to the execution lanes for execution at the same time. In other words, a thread group can only be included in a set of plural thread groups for issuing to the execution lanes for execution at the same time if (when) there is room for all of the active threads of the thread group in the set of plural thread groups that will be issued to the execution lanes for execution at the same time. This will help to reduce the complexity of the thread group selection and issuing process.

The above primarily discusses various arrangements and operations where the thread group selection circuitry will select plural thread groups for issuing to the execution lanes for execution and/or a single thread group having some inactive threads to issue to the execution lanes for execution.

The Applicants have also recognised that there may be thread groups for which there are no inactive threads. In that case, such a thread group can simply be selected and issued on its own to the execution lanes for execution (as that thread group should then fully occupy all the execution lanes of the execution processing circuitry). Thus, in the case where all the threads of a thread group are indicated as being active, then the thread group selection circuitry and process is in an embodiment operable simply to issue such a thread group to the execution lanes for execution as a whole (i.e. to select a set of that single thread group for issue to the execution lanes for execution).

Equally, the Applicants have recognised that it may be the case that not all the thread groups with inactive threads will be able to be (potentially) combined with another thread group or groups, and/or so as to have two or more instructions executed for that thread group at the same time. In this case, such a thread group can simply be issued on its own to the execution lanes for execution, in the normal manner (such that some of the execution lanes may then be inactive (and are in an embodiment disabled) for that thread group).

The thread group selection circuitry process in an embodiment operates to repeatedly select a set of at least one thread group to issue to the execution lanes for execution from the thread groups in the thread group pool, one after another, e.g., and in an embodiment, until all the required thread groups have executed the program in question (e.g., and in an embodiment, until the thread group pool is empty).

The process of selecting plural sets of at least one thread group to issue to the execution lanes for execution from the thread group pool in turn can be performed in any suitable and desired manner. For example, the thread group selection circuitry or process could simply consider a first (e.g. the oldest or a random) thread group in the thread group pool, and determine whether to issue it to the execution lanes for execution on its own or in combination with another thread group (if possible, e.g. by finding a best matching other thread group), and proceed to do that, and then move on to a next thread group in the thread group pool, and so on.

Additionally or alternatively, the thread group selection circuitry and process could assess plural (e.g. all) of the thread groups in the thread group pool to identify a suitable thread group or groups to issue to the execution lanes for execution, and then issue the selected thread group or groups to the execution lane for execution, and then identify another suitable thread group or plural thread groups for issuing to the execution lanes for execution, and so on. This could comprise, for example, trying all possible combinations of thread groups that are available, and then selecting the combination of thread groups that has the greatest amount of active lanes available for issuing to the execution lanes for execution. This would help to maximise the utilisation of the execution lanes.

There could also, e.g., be a fall-back position that the thread group selection circuitry and process operates to in any event issue a thread group to the execution lanes for execution when that thread group has been in the thread group pool for, e.g., greater than a particular, in an embodiment selected, in an embodiment predetermined, period (e.g. a number of cycles). This would then help to avoid thread groups remaining in the thread group pool for excessively long periods (and (help to) ensure forward progress guarantees).

Other arrangements would, of course, be possible.

Once a set of at least one thread group to issue to the execution lanes for execution has been selected, that set of at least one thread group should be, and is in an embodiment, issued to the execution lanes for execution. This can be, and is in an embodiment, done in a manner appropriate for the data processor in question. The execution lanes will then operate to execute the appropriate instruction or instructions for the thread group or groups in the set of at least one thread group for the active threads of the thread group or groups, in the normal manner for the data processor.

The result or results generated by executing the instructions for the active threads of the thread group or groups may be used as desired. For example, they may be output, e.g. to external memory, and/or they may be provided for, and used by, further instructions in the set of instructions (in the program) being executed.

In all cases, the result(s) may be used by the data processor as generated output. The output that is generated by the data processor can be any suitable and desired output, such as in the case of a graphics processor, a render output, such as a frame (image) to be displayed, a texture (in a render-to-texture) operation, etc.

This will then be repeated for the next set of at least one thread group that is selected, and so on.

The process will issue the active threads from the thread group or groups in the selected set of at least one thread group to appropriate execution lanes for execution.

The thread group selection circuitry accordingly in an embodiment also has associated with it appropriate instruction selection circuitry and data selection circuitry operable to provide to the execution lanes the appropriate instruction or instructions and data for the selected thread group or groups to be issued to the execution lanes (and to route the instruction or instructions for the selected thread group or groups appropriately to the execution lanes, and to route the data for the active threads of the selected thread group or groups to the appropriate execution lanes).

In order to facilitate correct routing (e.g. storage) from the execution lanes when executing groups of execution threads in the manner of the technology described herein, in an embodiment the thread group (and, e.g., thread (lane) within the thread group) is noted and tracked for each execution lane. This will then enable the appropriate thread group and thread (lane) within that group that an execution lane is processing to be identified.

This may be, and is in an embodiment, done using the thread group identifiers stored for the thread groups in the thread group pool. (As discussed above, in an embodiment the thread group pool also stores an identifier for each thread group. That thread group identifier can then be used when tracking the thread group through the execution lanes.)

The thread group (and thread) identity can be associated with an execution lane in any suitable and desired manner. In an embodiment, this information is maintained as per-execution lane meta information that is associated with the execution lanes.

The technology described herein has been described above with reference to the operation of the data processor in general. In the case where the data processor includes multiple processing cores, then each processing core can, and in an embodiment does, operate in the manner of the technology described herein (i.e. such that each processing core has its own respective execution processing circuitry, thread group managing circuitry and thread group selection circuitry, etc., all of which are operable in the manner of the technology described herein).

In some embodiments, the data processor comprises, and/or is in communication with, one or more memories and/or memory devices that store the data described herein, and/or store software for performing the processes described herein. The data processor may also be in communication with a host microprocessor, and/or with a display for displaying images based on the data generated by the data processor.

In an embodiment, the data processor is part of an overall data processing system that comprises one or more memories and/or memory devices and a host processor (and, optionally, a display). In an embodiment, the host microprocessor is operable to execute applications that require data processing by the data processor, with the data processor operating in the manner of the technology described herein when required to process data by applications executing on the host processor.

Other arrangements would, of course, be possible.

The technology described herein can be used for all forms of output that a data processor (and processing pipeline) may be used to generate. For example, in the case of graphics processing, the graphics processing pipeline may generate frames for display, render-to-texture outputs, etc. The output data values from the processing are in an embodiment exported to external, e.g. main, memory, for storage and use, such as to a frame buffer for a display.

The technology described herein is applicable to any suitable form or configuration of data processor and data processing system. It is particularly applicable to tile-based graphics processors and graphics processing systems. Thus in an embodiment, the data processor is a tile-based graphics processor (and pipeline).

In an embodiment, the various functions of the technology described herein are carried out on a single data processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display. However, it will be appreciated that the techniques for handling groups of execution threads described herein can be used in other non-graphics contexts in which groups of threads are used.

FIG. 1 shows a typical graphics processing system. An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 3 of the present embodiment in more detail.

The graphics processing pipeline 3 shown in FIG. 2 is a tile-based renderer and will thus produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. The compiler may, e.g., be part of the driver 4, with there being a special API call to cause the compiler to run. The compiler execution can thus be seen as being part of the draw call preparation done by the driver in response to API calls generated by an application. (Other compiler arrangements would, of course, be possible.)

FIG. 3 illustrates this, and shows the shader program being provided in the high level shader programming language 40 by the application 2 to the driver 4, which then compiles 41 the shader program to the binary code 42 for the graphics processing pipeline 3.

As discussed above, each shader in the graphics processing pipeline is a processing stage that performs graphics processing by running small programs for each "work" item in a graphics output to be generated (an "item" in this regard is usually a vertex, or a fragment). For each work item to be processed, an execution thread that will execute the corresponding shader program is issued to appropriate programmable processing circuitry that then executes the shader program for the execution thread in question.

The present embodiments relate to systems where threads that are to execute a shader program can be organised into groups ("warps") of threads that are to be run in lockstep, one instruction at a time.

In the case of the fragment shader 27, for example, the fragment shading program that is being executed may be run once for each sampling position (or point) that is to be processed, with one execution thread being spawned for each sampling position. The sampling positions (and thus accordingly their corresponding execution threads) may be organised into and processed as groups of plural sampling positions (and thus threads), each corresponding to the sampling positions associated with a graphics fragment. In the present embodiments, the sampling positions are organised into 2×2 "quads", and are correspondingly processed in the fragment shader as thread groups ("warps") containing four threads, each corresponding to one of the sampling positions of the "quad". The group of threads representing a given sampling position quad then execute the fragment shader program in lockstep, one instruction at a time.

In such arrangements, in order to execute the execution threads of a thread group, e.g., so as to perform a fragment shading operation, the execution threads will be appropriately issued to appropriate functional units, such as arithmetic processing units, to perform the processing operations required by the shader program in question. In the case where threads can be organised into and executed as respective thread groups of plural threads, then typically the functional units will be arranged as plural execution lanes, one for each thread of a thread group.

As such, each function unit (or set of associated functional units) will be arranged and operable as a plurality of execution lanes, to which respective threads of a thread group can be issued for execution. When a thread group is to be executed, appropriate control logic will issue the relevant data and instruction to be executed to the appropriate execution lanes of a functional unit, so that the instruction in question can be executed for the threads of the thread group by the functional unit in parallel.

Figure 4A:
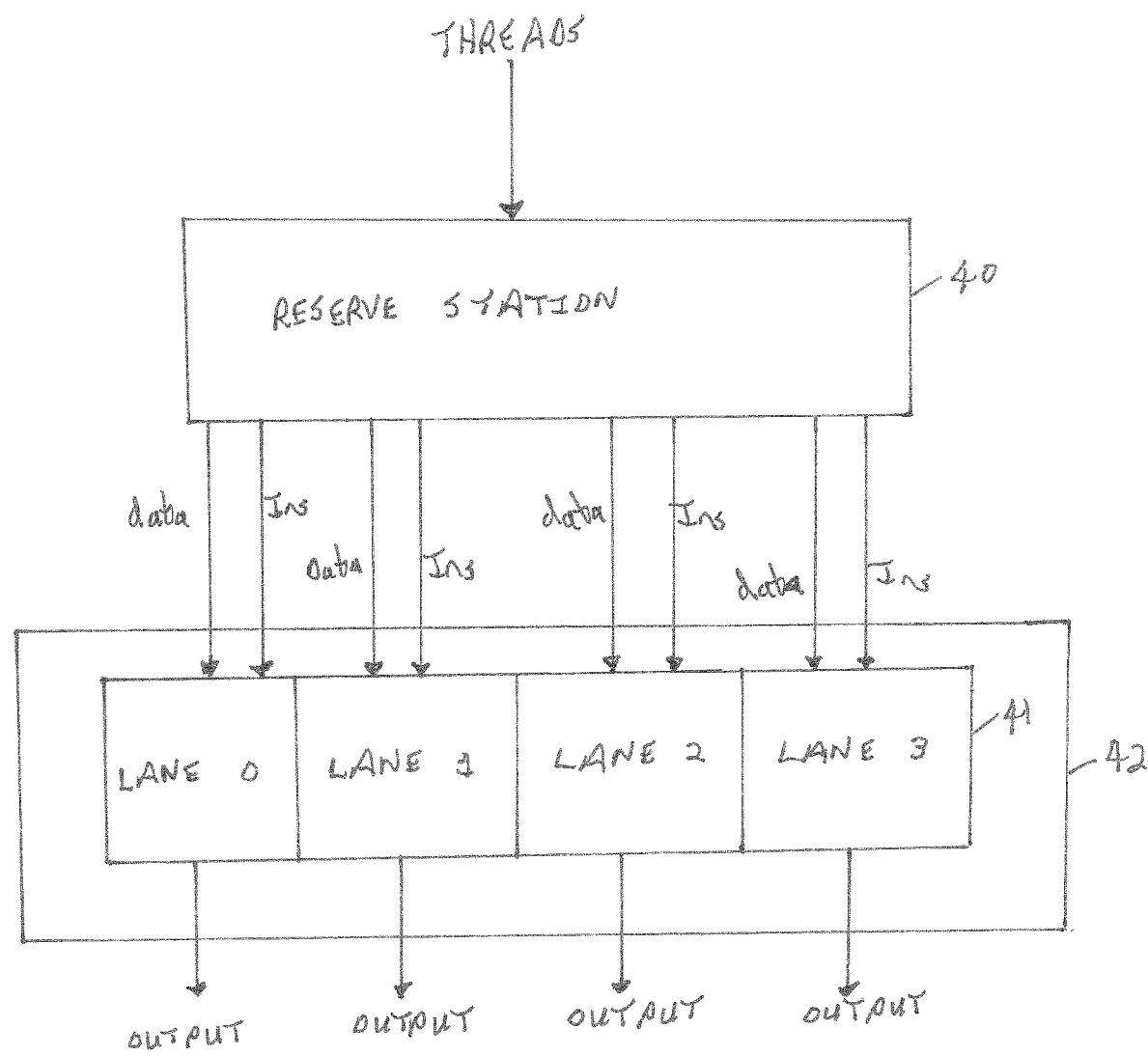
FIGS. 4A and 4B show schematically the issuing of threads to execution lanes for execution.
Figure 4B:
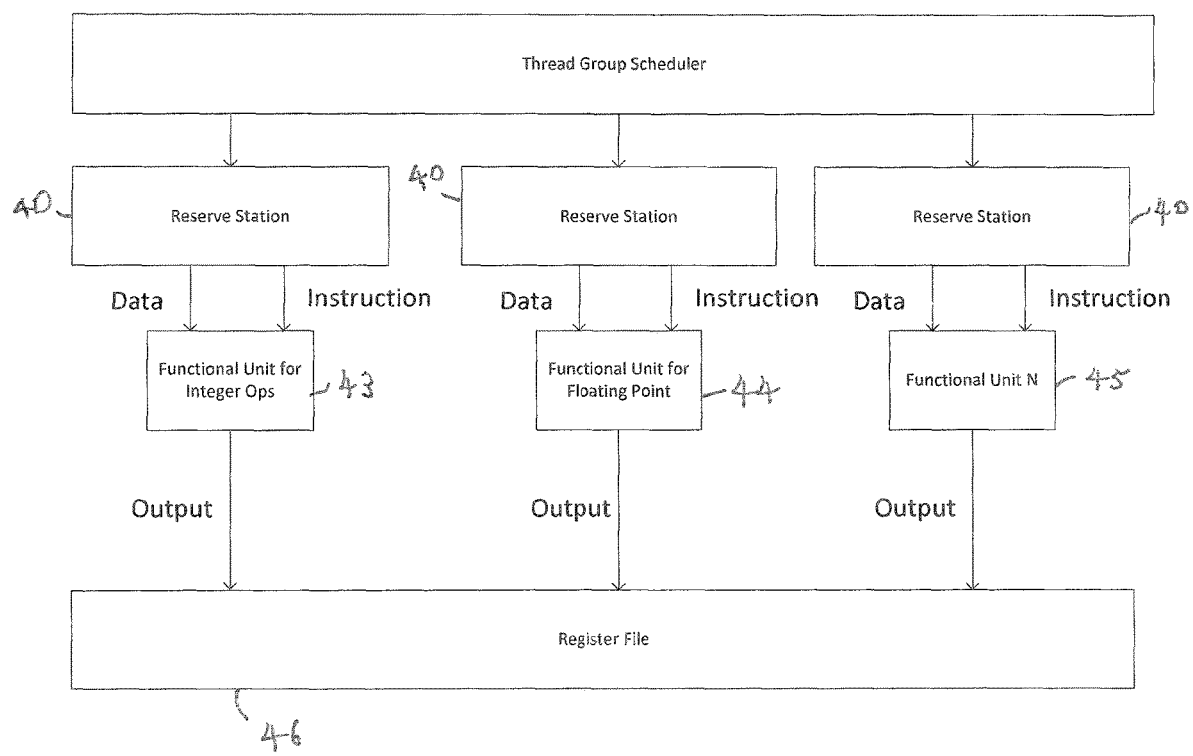

FIGS. 4A and 4B illustrate this.

FIG. 4A shows a functional unit 42 arranged as a set of four execution lanes 41 (so as to correspond to thread groups having four threads (other arrangements would, of course, be possible)), and appropriate control logic in the form of a "reserve station" 40 for issuing the appropriate data and an instruction for each thread of a thread group to a respective execution lane of the set of execution lanes 41 of the functional unit 42. (The reserve station (control logic) 40 will receive threads for execution, e.g., from a thread spawner or a thread spawning process of the graphics processor.)

Where the graphics processor includes plural different functional units that may each execute execution threads to perform processing operations, then each of the functional units may be, and is in an embodiment, arranged as shown in FIG. 4A, i.e. to include a set of plural execution lanes and a corresponding reserve station (control logic) for issuing threads for execution to the execution lanes of the functional unit.

FIG. 4B illustrates this, and shows respective different functional units 43, 44, 45 (each of which will be arranged to contain plural execution lanes as shown in FIG. 4B) each having their own respective reserve station control logic 40 that is operable to issue threads and thread groups for execution to the respective functional unit, with the functional units correspondingly providing their outputs, e.g. to a register file 46.

The functional units may comprise, for example, one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store-type units (such as blend or store units), etc.

The present embodiments relate to more efficient mechanisms for issuing thread groups to the execution lanes of a functional unit or units for execution.

In particular, rather than simply issuing the next thread group that is ready to the execution lanes for execution when executing a shader program, a pool of thread groups available to be issued to the execution lanes is maintained, and then the next thread group or groups to issue to the execution lanes for execution from the thread group pool is selected based at least in part on which threads of the thread groups in the thread group pool are indicated as being "active". As will be discussed further below, this is done in particular to try to identify sets of two (or more) thread groups that can be executed simultaneously using the execution lanes, and/or to identify thread groups for which two (or more) different instructions can be executed simultaneously using the execution lanes.

Thus, in the present embodiments, the control logic (reserve station) 40 that is operable to issue threads to the execution lanes 41 of a functional unit maintains a pool of thread groups that are available to be issued to the execution lanes for execution, and includes appropriate control logic to select sets of at least one thread group from the pool of available thread groups for issue to the execution lanes for execution (based at least in part on the active threads of the thread groups).

Figure 5:
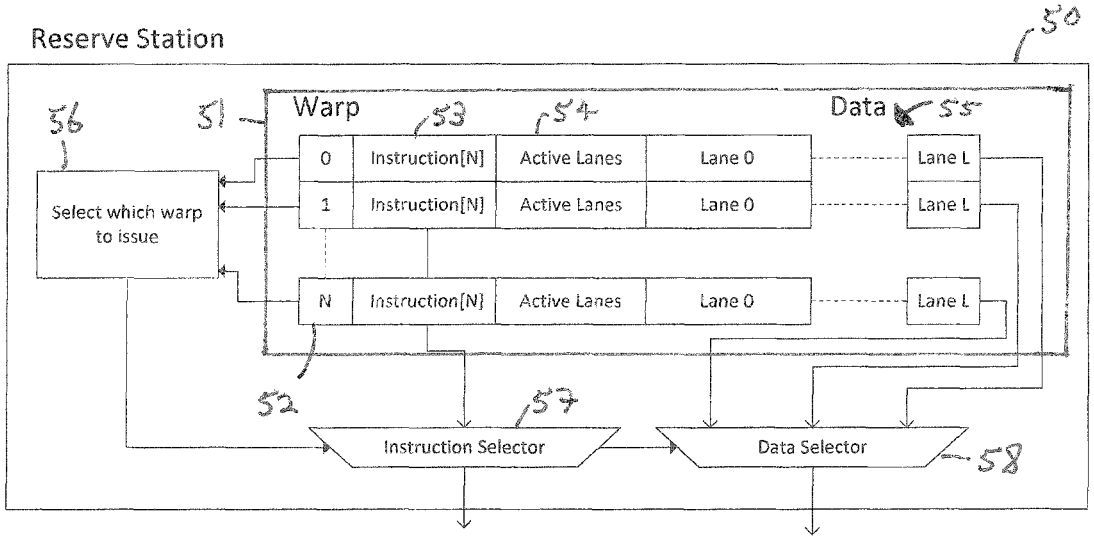
FIG. 5 shows schematically execution thread group issuing circuitry in embodiments of the technology described herein.

FIG. 5 illustrates this and shows the control logic (reserve station) 50 of the present embodiments in more detail.

As shown in FIG. 5, the thread group issuing control logic (reserve station) 50 maintains a pool 51 of thread groups (warps) available for issue to the execution lanes in the form of a thread group table.

This table stores, for each thread group (warp), an identifier 52 for the thread group (warp) in question; an indication 53 of a set of at least one next instruction to be executed for the thread group (this may be in the form, for example, of a next instruction pointer (program count (PC)) for the thread group); an indication 54 of the active threads of the thread group (i.e. those threads of the thread group that will be required to be executed to produce a useful output when the thread group is executed by the execution lanes); and an indication 55, for each thread of the thread group, of the data to be processed for that thread (e.g. the data that is to be fetched for the thread from the register file).

The indication 53 of a set of at least one next instruction to be executed by the thread group could indicate a single (i.e. the next) instruction to be executed only, or it could indicate a set of plural instructions to be executed next (e.g. the next N instructions in the sequence of instructions to be executed by the thread group). The number of next instructions to be executed that are indicated may, e.g., depend upon the size of (and be a function of) the instruction cache bandwidth.

The indication of the active threads (lanes) for a thread group can take any suitable and desired form. As shown in FIG. 5, in the present embodiments it is in the form of a bitmap corresponding to the number of threads and their positions (their respective execution lanes) within the thread group. (The identification of threads of a thread group as being active or inactive can be achieved in any suitable and desired manner. In an embodiment appropriate, e.g. state, information is maintained to track and indicate which thread or threads of a thread group are active, and which threads of the thread group are inactive (disabled).)

As shown in FIG. 5, the thread group issuing logic (reserve station) 50 also includes thread group selection circuitry 56 which is operable to select a set of at least one thread group from the thread group pool 51 for issue to the execution lanes, and appropriate instruction selector circuitry 57 and data selector circuitry 58 that is operable to issue the appropriate instructions and data to the execution lanes for the threads and thread groups of a (and of each) set of at least one thread group that the thread group selection circuitry 56 selects for issue to the execution lanes 41.

In the present embodiments, the thread group selection circuitry 56 selects sets of at least one thread group to issue to the execution lanes for execution based on the indications of the active threads for the thread groups in the thread group pool 51. In particular, the thread group selection circuitry 56 is operable to (try to) identify plural thread groups each having at least one inactive thread, so as to try to combine plural thread groups each having an inactive thread or threads into a set of plural thread groups for issuing to the execution lanes for execution at the same time (in the same cycle). This then facilitates issuing plural different thread groups to the execution lanes for execution at the same time (based on the inactive threads of the thread groups), thereby increasing the throughput of the thread groups through the execution lanes 41.

In the present embodiments, only thread groups that total between them no more than the total number of execution lanes are selected as thread groups to be (potentially) combined into a set of plural thread groups that is issued to the execution lanes for execution at the same time (in the same cycle), as that then allows all the active threads for the selected thread groups to be executed at the same time by the execution lanes. Thread groups that will combine to provide a "full" combined thread group set (i.e. a thread group set that will use all of the execution lanes) are preferentially identified as thread group combining candidates (and accordingly selected as sets of thread groups for issue as a set to the execution lanes).

Figure 6:
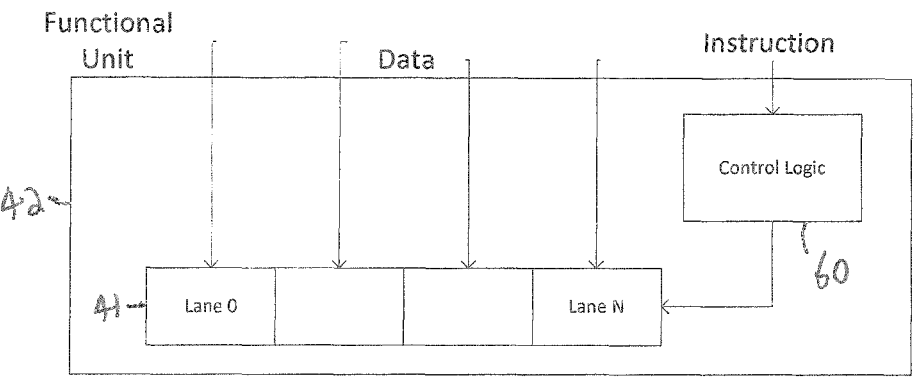
FIG. 6 shows schematically the arrangement of execution lanes in embodiments of the technology described herein.

A first embodiment of the operation of the thread group selection circuitry 56 will now be described with reference to FIGS. 6 and 7.

In this embodiment, the thread group selection circuitry operates to only identify thread groups having non-overlapping active threads (i.e. for which the active threads reside in different thread group (warp) lanes) as being thread groups that can be combined for simultaneous issue to the execution lanes for execution.

Furthermore, it is also assumed that the execution lanes 41 for a functional unit (or units) all share the same, single instruction decode circuitry, such that all the execution lanes are constrained to always have to each execute the same instruction at the same time. (FIG. 6 illustrates this, and shows an arrangement in which there is a single set of instruction decode circuitry 60 that decodes and provides the same instruction to each execution lane of the set of execution lanes 41 of the functional unit 42 for execution (although as shown in FIG. 6, each execution lane will process its own respective set of data for the execution thread that it is executing).)

Accordingly, in this embodiment, the thread group selection circuitry 56 (and the thread group selection process) also takes account of (and is based on) the next instruction or instructions (where a set of more than one next instruction to be executed for a thread group is maintained) indicated for the thread groups in the thread group pool 51.

In particular, the selection process is configured such that only thread groups that are to execute the same next instruction can be (and are) combined to form a set of at least one thread group that is issued to the execution lanes for execution at the same time (in the same cycle).

Figure 7:
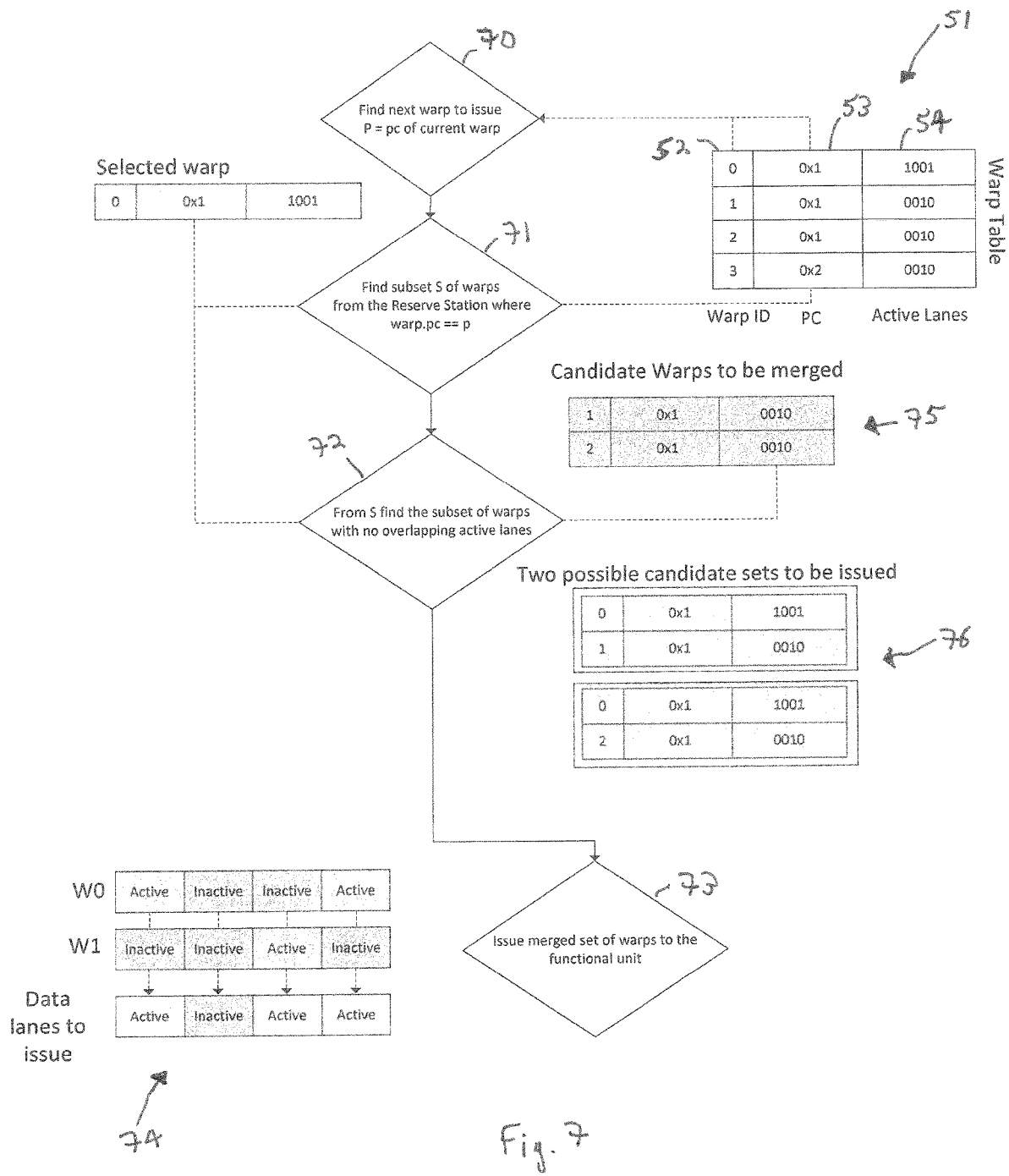
FIG. 7 shows schematically the selection of thread groups for issuing for execution by execution lanes in an embodiment of the technology described herein.

FIG. 7 shows this operation of the thread group selection circuitry 56 in this embodiment of the technology described herein.

As shown in FIG. 7, in this embodiment the thread group selection circuitry 56 first identifies the instruction that the next thread group (warp) in the thread group pool is to execute (step 70). In this embodiment it is assumed that the thread group selection circuitry 56 simply considers the next thread group in the pool and then determines whether there are other thread groups in the pool that can be combined with that thread group for issue to the execution lanes at the same time (in the same cycle). Other more sophisticated analysis of the thread group pool to identify potentially combinable thread groups could be performed if desired.

In the example shown in FIG. 7, it is assumed that thread group 0 is the next thread group to execute, and so the thread group selection circuitry 56 will determine that the next instruction to be executed is at the program count 0x1.

The thread group selection circuitry 56 then determines if there are any other thread groups in the thread group pool 51 that are to execute the same instruction next (step 71). In the present case, and as shown in FIG. 7, the thread group selection circuitry 56 will accordingly identify thread groups 1 and 2 as being candidate thread groups 75 that can be merged with thread group 0 (as all those thread groups are to execute the same instruction next (as they have the same program count 0x1)).

The thread group selection circuitry 56 then determines whether and which of the candidate thread groups 1 and 2 can be combined with the thread group 0 in such a manner that the active threads (the active lanes) for the thread groups do not overlap (step 72). As shown in FIG. 7, this identifies two possible sets 76 of plural thread groups that do not have overlapping active threads (lanes) that can be issued for execution in the same cycle, namely thread group 0 and thread group 1, or thread group 0 and thread group 2. The thread group selection circuitry 56 accordingly selects one of those candidate sets 76 of plural thread groups to be a set of thread groups to issue to the execution lanes for execution next and issues the selected set of plural thread groups to the functional unit for execution (step 73).

Each execution lane then produces its own respective output for the thread that it was executing. (The outputs generated by executing the instructions for the active threads of the thread groups may be used as desired. For example, they may be output, e.g. to external memory, and/or they may be provided for, and used by, further instructions in the set of instructions (in the program) being executed.)

In order to facilitate correct routing (e.g. storage) of the outputs from the execution lanes the thread group (and thread (lane) within the thread group) is noted and tracked for each execution lane using the thread group identifiers 52 stored for the thread groups in the thread group pool 51. This enables the appropriate thread group and thread (lane) within that group that an execution lane is processing to be identified.

FIG. 7 shows 74 the execution lanes that will be active and which thread group they will be processing in the case where thread groups 0 and 1 are combined to form a set of thread groups that is issued to the execution lanes for execution at the same time (in the same cycle).

This process is repeated for the next thread group in the pool (which in the present example, assuming that a combination of a set of thread group 0 and thread group 1 have been issued for execution, will be thread group 2), and so on, until all the necessary thread groups have been executed.

A second embodiment of the operation of the thread group selection circuitry 56 will now be described with reference to FIG. 8.

This embodiment is similar to the embodiment shown in FIG. 7 (thus the execution lanes 41 all share the same, single instruction decode circuitry, such that all the execution lanes are constrained to always have to each execute the same instruction at the same time), but unlike in the embodiment shown in FIG. 7, in this embodiment, the control logic (reserve station) 50 can also remap the allocation of the threads to thread group lanes for thread groups. This will then allow initially overlapping thread groups to be (potentially) bundled together for issue to the execution lanes at the same time.

Accordingly, in this embodiment, the thread group selection process is again configured such that only thread groups that are to execute the same next instruction can be (and are) combined to form a set of at least one thread group that is issued to the execution lanes for execution at the same time (in the same cycle).

Figure 8:
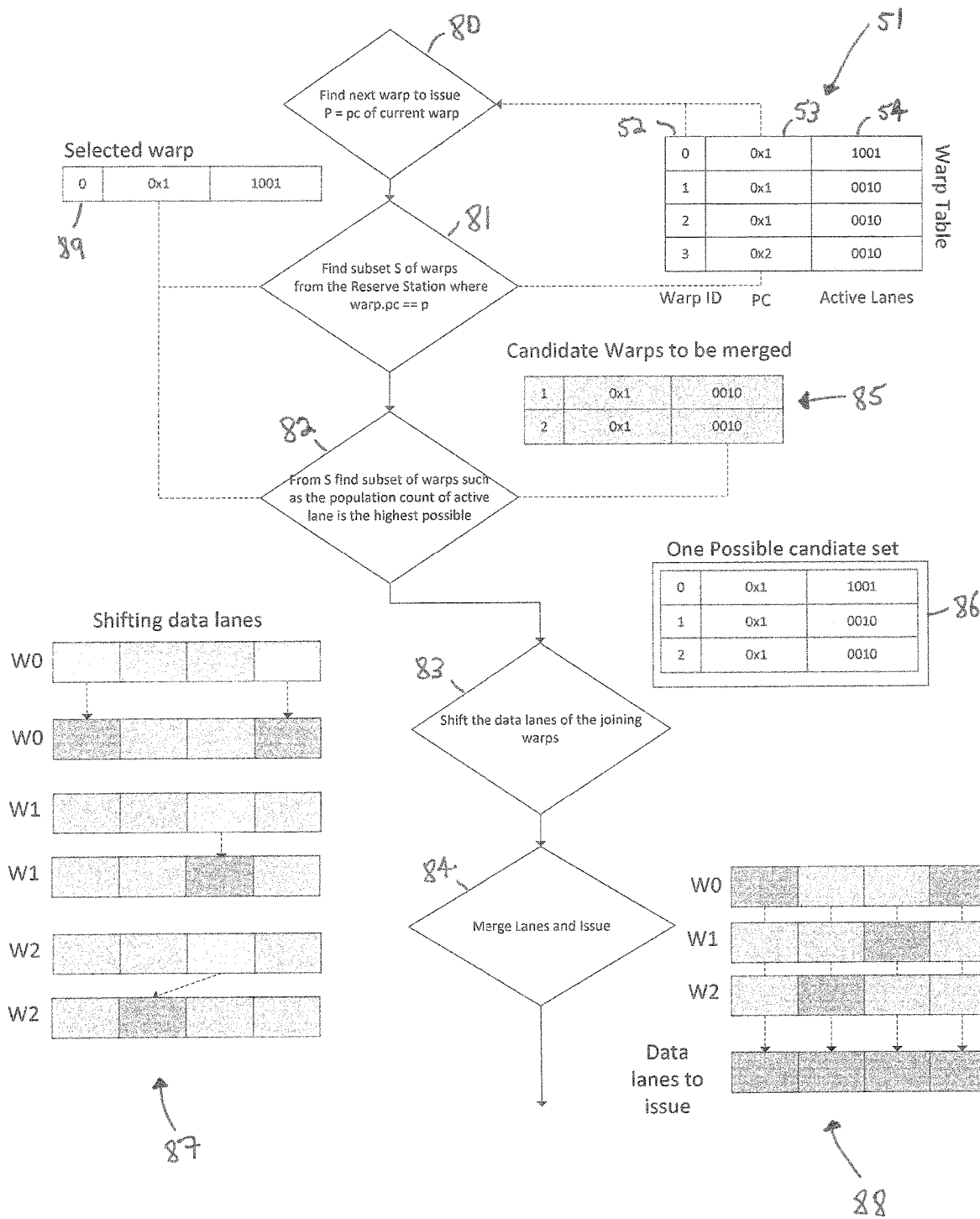
FIG. 8 shows schematically the selection of thread groups for issuing for execution by execution lanes in another embodiment of the technology described herein.

Thus, as shown in FIG. 8, in this embodiment the thread group selection circuitry 56 again first identifies the instruction that the next thread group (warp) in the thread group pool is to execute (step 80).

The thread group selection circuitry 56 then determines if there are any other thread groups in the thread group pool 51 that are to execute the same instruction next (step 81). In the present case, and as shown in FIG. 8, the thread group selection circuitry 56 will accordingly identify thread groups 1 and 2 as being candidate thread groups 85 that can be merged with thread group 0 (as all those thread groups are to execute the same instruction next (as they have the same program count 0x1)).

The thread group selection circuitry 56 then determines a set of thread groups from the selected thread group 89 and the identified merge candidate thread groups 85 that can be combined such that the number of active threads (execution lanes) will be the highest possible (but without exceeding the maximum number of execution lanes) (step 82).

As shown in FIG. 8, this identifies that all three of the thread groups, thread group 0, thread group 1 and thread group 2 can be combined so as to "fill" (but not exceed) the available execution lanes.

The thread group selection circuitry 56 accordingly selects this candidate set 86 of plural thread groups to be a set of thread groups to issue to the execution lanes 41 for execution next.

However, as shown in FIG. 8, in this case the thread group 1 and thread group 2 in the candidate set 86 for thread groups to issue to the execution lanes at the same time have overlapping active threads (execution lanes).

Accordingly, as shown in FIG. 8, the data for the active lane of thread group 0 is shifted to the second execution lane (which is not active in any of the thread groups) so as to remove this overlap (step 83). This shifting of the data lanes 87 is also shown in FIG. 8.

This then removes the overlap between the active threads (lanes) of the thread groups, so that the set of thread groups 0, 1 and 2 can then be issued to the execution lanes for execution (step 84).

Again, in order to facilitate correct routing (e.g. storage) of the outputs from the execution lanes the thread group (and thread (lane) within the thread group) is noted and tracked for each execution lane using the thread group identifiers 52 stored for the thread groups in the thread group pool 51.

Similarly, any remapping (data redistribution) for a remapped thread group is tracked or otherwise recorded in some way so as to allow the data processing operation to still ensure that any operations performed on a "remapped" thread group are performed correctly, and to allow the final results for the remapped thread group to be "unmapped" as needed, e.g. when they are to be committed to an output.

FIG. 8 shows 88 the execution lanes that will be active and which thread group they will be processing in the case where thread groups 0, 1 and 2 are combined to form a set of thread groups that is issued to the execution lanes for execution at the same time (in the same cycle) in the above manner.

This process is repeated for the next thread group in the pool (which in the present example, assuming that a combination of a set of thread group 0, thread group 1 and thread group 2 have been issued for execution, will be thread group 3), and so on, until all the necessary thread groups have been executed.

Figure 12:
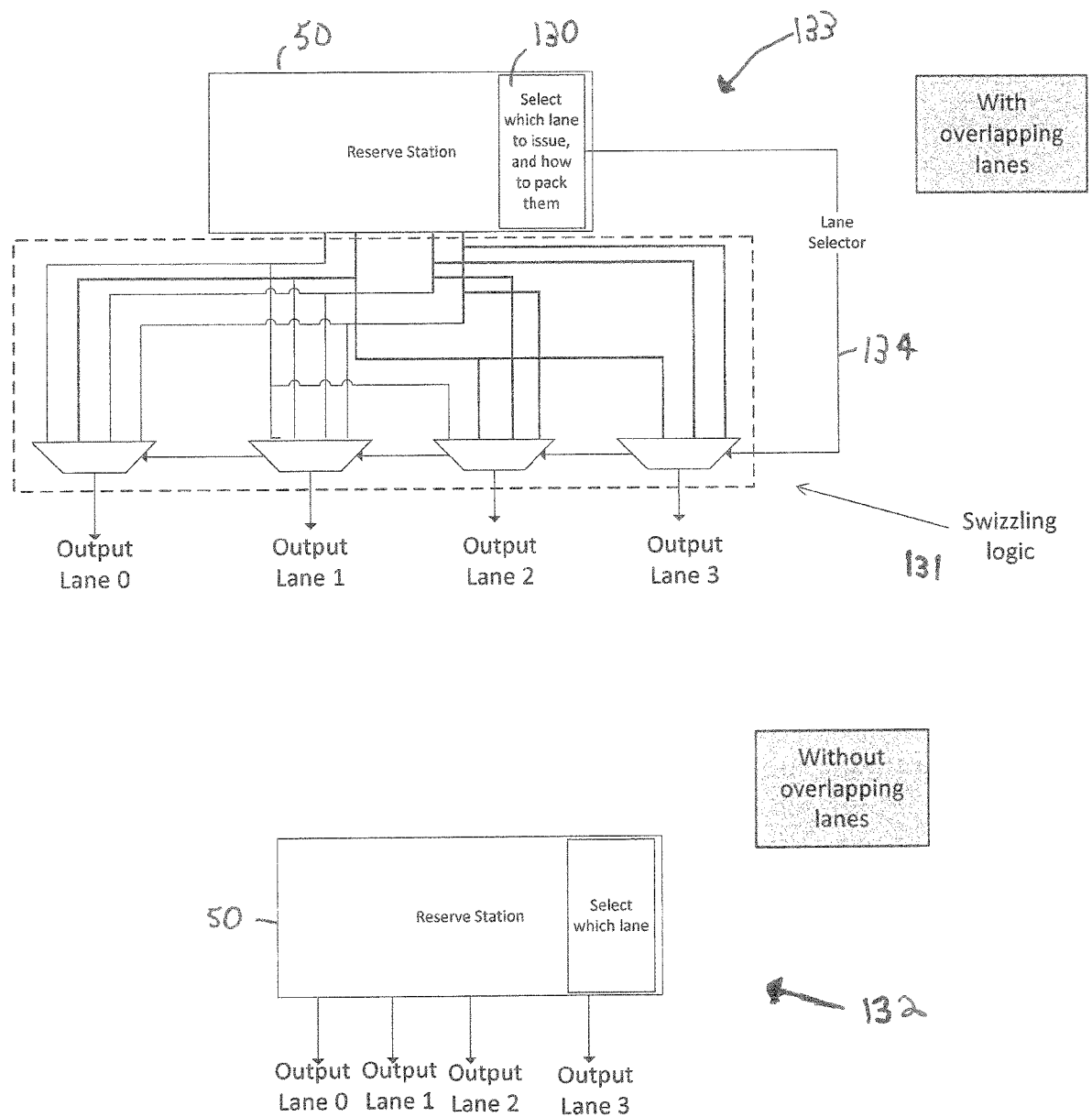
FIG. 12 shows schematically an arrangement for remapping threads of a thread group to different execution lanes.

FIG. 12 shows schematically an arrangement 133 for remapping the active lanes of thread groups to different execution lanes. As shown in FIG. 12, the control logic (reserve station) 50 in this arrangement includes lane selection logic 130 operable to select which active threads to issue to the execution lanes and how to arrange the active threads across the available execution lanes, and appropriate swizzling logic 131 operable to issue active threads from thread groups to the selected execution lanes accordingly under the control 134 of the lane selection logic 130.

FIG. 12 also shows for comparison purposes, an arrangement 132 of the control logic (reserve station) 50 which does not have the capability of remapping threads in thread groups to different active lanes, and that accordingly does not require, for example, the swizzling logic 131.

In the above embodiments, it is assumed that each execution lane will execute the same instruction at any given time.

Figure 9:
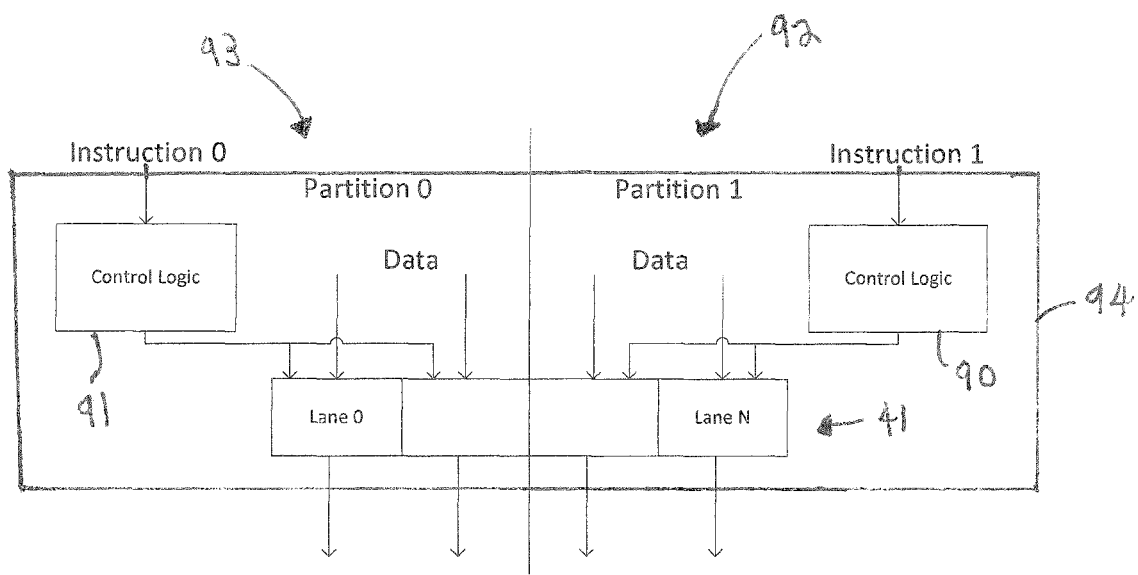
FIG. 9 shows schematically the arrangement of execution lanes in embodiments of the technology described herein.
Figure 10:
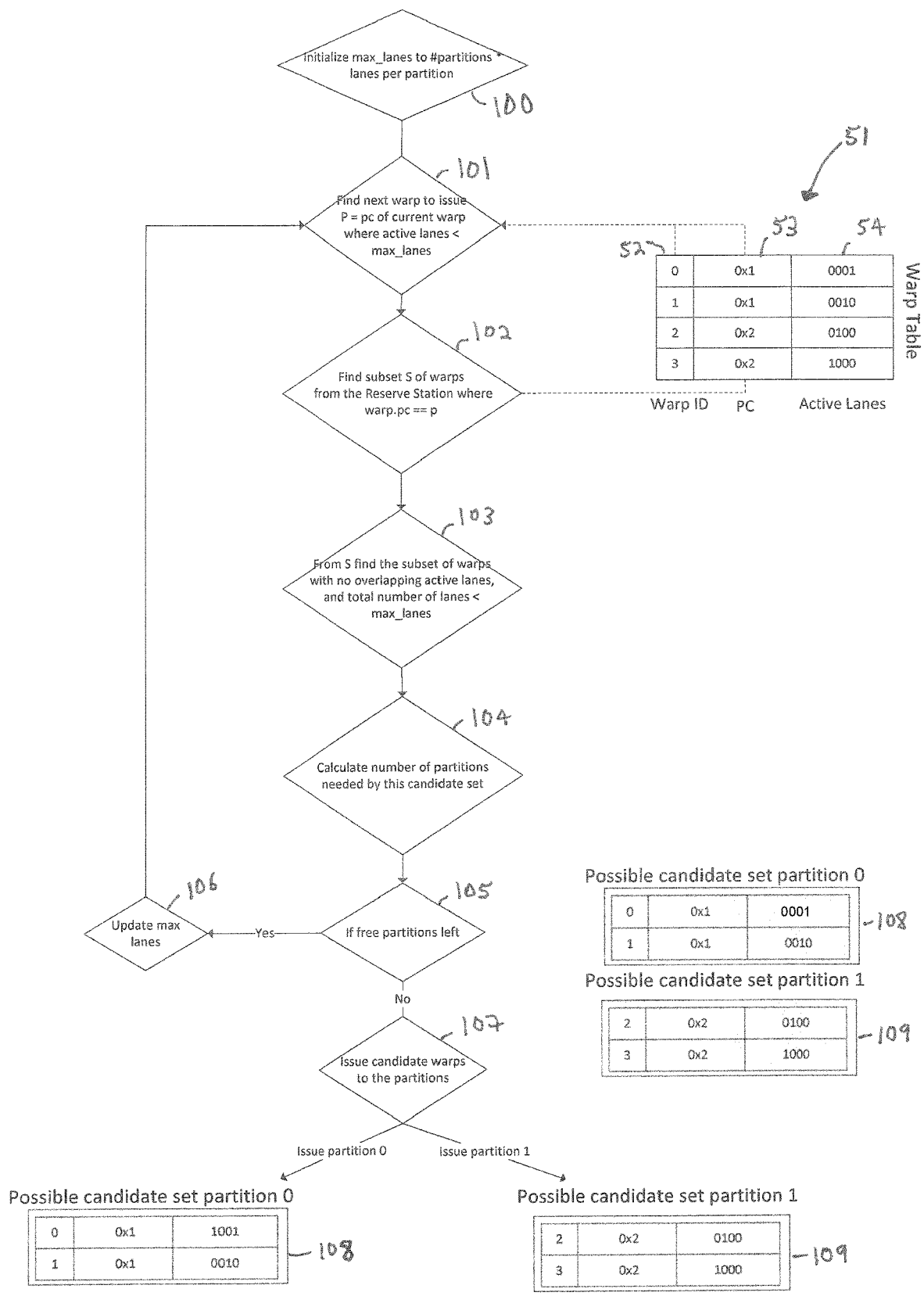
FIG. 10 shows schematically the selection of thread groups for issuing for execution by execution lanes in another embodiment of the technology described herein.
Figure 11:
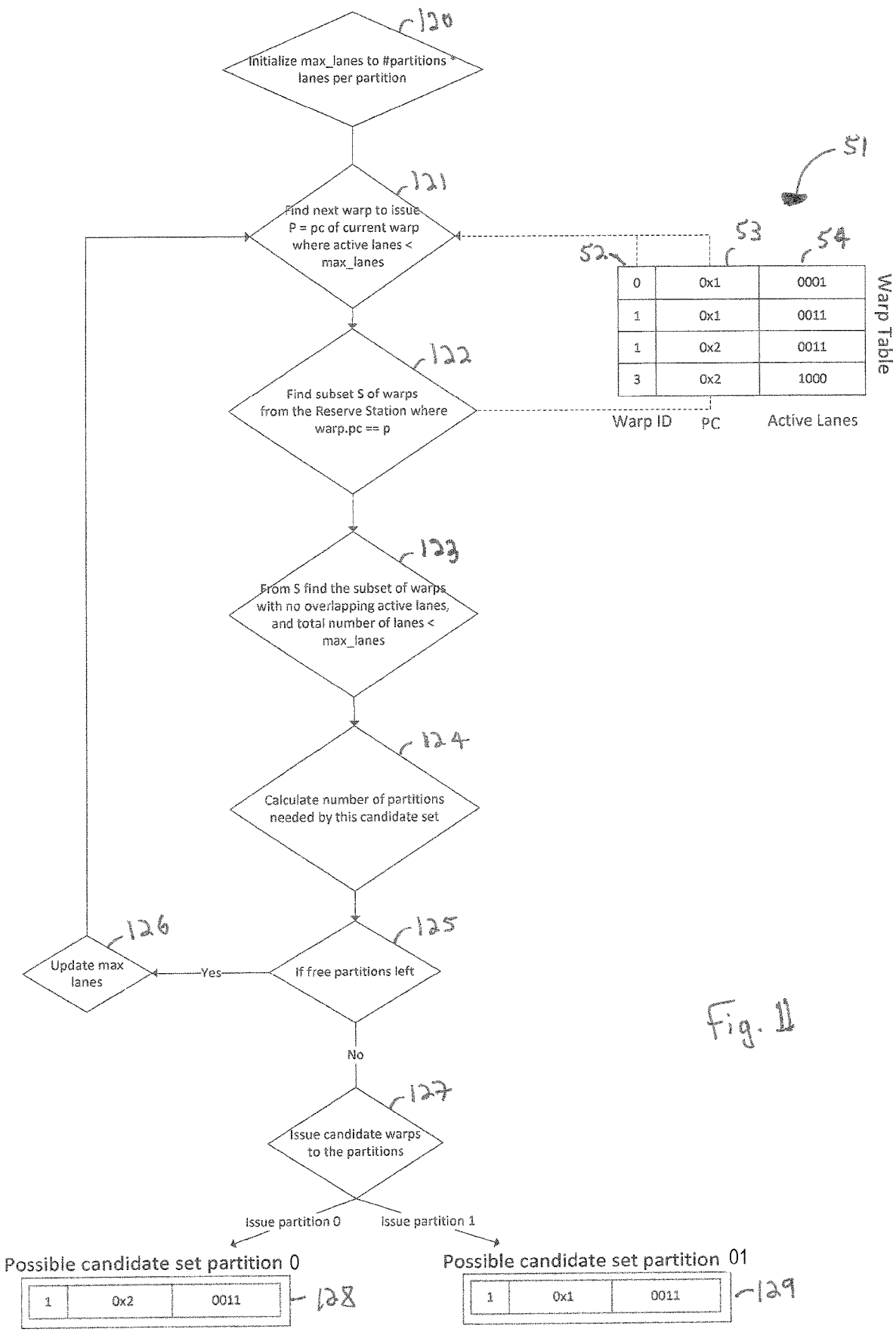
FIG. 11 shows schematically the selection of thread groups for issuing for execution by execution lanes in another embodiment of the technology described herein.

FIGS. 9, 10 and 11 show alternative embodiments of the technology described herein in which different execution lanes can execute different instructions at the same time.

In particular, as shown in FIG. 9, in these embodiments, the execution lanes 41 of a functional unit 94 are divided into respective subsets (partitions), 92, 93, each of which has its own respective instruction decode circuitry 90, 91 that decodes and provides an instruction to the execution lanes of the respective subset (partition) of the execution lanes 41. This will then allow the different subsets (partitions) of the execution lanes to execute different instructions at the same time. (It should be noted here that while this requires additional instruction decode circuitry for the execution lanes, that does not add significant control logic overhead, as the instruction decoding will require significantly less control logic overhead than the actual processing logic of the execution lanes themselves.)

FIG. 9 shows the execution lanes being divided into two subsets (partitions) 92, 93. Other arrangements in which more than two partitions are used (including, e.g., arrangements in which each individual execution lane has its own instruction decode circuitry) could be used, if desired.

In this case, because there is respective instruction decode circuitry provided for each of plural different subsets of the execution lanes, then there does not in practice need to be a requirement that all the execution lanes execute the same instruction at any given time, but rather the requirement is that each respective subset (partition) of the execution lanes is executing the same instruction. In this embodiment therefore, thread groups executing different instructions next can be combined together in a single thread group set.

FIG. 10 accordingly shows such operation of the thread group selection circuitry 56 in an embodiment of the technology described herein.

As shown in FIG. 10, in this embodiment the process starts by the thread group selection circuitry 56 initially determining the maximum number of execution lanes that are available for processing threads at any one time (based on the number of different thread execution lane partitions, and the number of lanes per partition) (step 100).

The thread group selection circuitry 56 then identifies a next thread group in the pool to be issued that has fewer active threads (lanes) than the available execution lanes (if any), and identifies the instruction that that next thread group (warp) in the thread group pool is to execute (step 101).

In the example shown in FIG. 10, it is assumed that thread group 0 is the next thread group to execute, and so the thread group selection circuitry 56 will determine that the next instruction to be executed for that thread group is at the program count 0x1.

The thread group selection circuitry 56 then determines if there are any other thread groups in the thread group pool 51 that are to execute the same instruction next (step 102).

In the present case, and as shown in FIG. 10, the thread group selection circuitry 56 will accordingly identify thread group 1 as being a candidate thread group that can be merged with thread group 0.

The thread group selection circuitry 56 then determines a suitable subset of the thread groups from the candidate set of thread groups (in this case that also do not have overlapping active threads (lanes), (although as discussed above that may not be necessary)), and for which the total number of lanes is less than the maximum number of execution lanes that are available (step 103).

The thread group selection circuitry then determines how many of the execution lane partitions (subsets) are needed by the determined candidate set of thread groups (step 104).

It is then determined whether any execution lane subsets (partitions) are still free (step 105). If so, the maximum number of available lanes is updated accordingly (step 106), and the process is repeated to try to determine if there is another set of at least one thread group that can be issued to the remaining free execution lane partition or partitions.

Once no free execution lane subsets (partitions) are left, the thread group selection circuitry 56 issues the selected sets of plural thread groups to the respective execution lane partitions (subsets) for execution (step 107).

As shown in FIG. 10, in the present example, the thread group selection circuitry 56 will accordingly identify thread groups 0 and 1 as a possible candidate set 108 for issuing to one subset (partition) of the execution lanes, and subsequently identify thread groups 2 and 3 as a second set 109 of plural thread groups for issuing to the other subset (partition) of the execution lanes (assuming that there are four execution lanes divided into two subsets of two execution lanes each).

Each execution lane then produces its own respective output for the thread that it was executing. Again, in order to facilitate correct routing (e.g. storage) of the outputs from the execution lanes the thread group (and thread (lane) within the thread group) is noted and tracked for each execution lane using the thread group identifiers 52 stored for the thread groups in the thread group pool 51.

This process is repeated for the next thread groups in the pool, and so on, until all the necessary thread groups have been executed.

FIG. 11 shows an enhancement of the embodiment of FIG. 10 in which different execution lanes can execute different instructions at the same time.

In this case, as well as selecting thread groups that are executing different instructions for combining into a thread group set, the thread group selection circuitry 56 can select a single thread group to issue to the execution lanes for execution next, but operate to send the active threads for the thread group to one (or more) subset of the execution lanes in association with a first instruction to be executed for the thread group, and the same active threads of the thread group to a second subset (or subsets) of the execution lanes in association with (i.e. to execute) a different instruction for the thread group (and so on, where more execution lane partitions exist).

As shown in FIG. 11, in this embodiment the process again starts by the thread group selection circuitry 56 initially determining the maximum number of execution lanes that are available for processing threads at any one time (based on the number of different thread execution lane partitions, and the number of lanes per partition) (step 120).

The thread group selection circuitry 56 then identifies a next thread group in the pool to be issued that has fewer active threads (lanes) than the available execution lanes (if any), and identifies the instruction that that next thread group (warp) in the thread group pool is to execute (step 121).

In the example shown in FIG. 11, it is assumed that the process has reached thread group 1 as the next thread group to execute, and so the thread group selection circuitry 56 will determine that the next instruction to be executed for that thread group is at the program count 0x1.

The thread group selection circuitry 56 then determines if there are any other thread groups in the thread group pool 51 that are to execute the same instruction next (step 122).

The thread group selection circuitry 56 then determines a suitable subset of the thread groups from the candidate set of thread groups (in this case that also do not have overlapping active threads (lanes), (although as discussed above that may not be necessary)), and for which the total number of lanes is less than the maximum number of execution lanes that are available (step 123).

In the present case, and as shown in FIG. 11, the thread group selection circuitry 56 will not identify another thread group that is to execute the same next instruction as thread group 1, and so will select thread group 1, instruction 0x1, as a set of one thread group to issue to a subset (partition) of the execution lanes for execution.

The thread group selection circuitry then determines how many of the execution lane partitions (subsets) are needed by the determined candidate set of thread groups (step 124).

It is then determined whether any execution lane subsets (partitions) are still free (step 125). If so, the maximum number of available lanes is updated accordingly (step 126), and the process is repeated to try to determine if there is another set of at least one thread groups that can be issued to the remaining free execution lane partition or partitions.

In this case, as shown in FIG. 11, the thread group selection circuitry 56 will identify thread group 1 as the next thread group to execute and determine that the next instruction to be executed for that thread group is at the program count 0x2.

The thread group selection circuitry 56 will then determine that the active threads for thread group 1 will fill the remaining execution lane subset (steps 122 and 123) and so will select thread group 1, instruction 0x2, as a set of one thread group to issue to a subset (partition) of the execution lanes for execution (in combination with issuing thread group 1, instruction 0x1 to the other subset of the execution lanes).

The thread group selection circuitry will then determine that there are no free execution lane subsets (partitions) left, and so issue the duplicate sets 128, 129 of the active threads thread group 1 to the respective execution lane partitions (subsets) for execution (step 127).

As shown in FIG. 11, in the present example, the thread group selection circuitry 56 will accordingly issue the active threads for thread group 1 to one subset (partition) of the execution lanes to execute instruction 0x1, and will issue the active threads for thread group 1 to the other subset (partition) of the execution lanes to execute instruction 0x2 (assuming that there are four execution lanes divided into two subsets of two execution lanes each).

Each execution lane then produces its own respective output for the thread that it was executing. Again, in order to facilitate correct routing (e.g. storage) of the outputs from the execution lanes the thread group (and thread (lane) within the thread group) is noted and tracked for each execution lane using the thread group identifiers 52 stored for the thread groups in the thread group pool 51.

This process is repeated for the next thread groups in the pool, and so on, until all the necessary thread groups have been executed.

In this embodiment, the process is constrained so as to avoid issuing to the execution lanes for a thread group at the same time two (or more) instructions that have a dependency between them (e.g. one instruction being dependent on the result of the other instruction).

The above primarily discusses various arrangements and operations where the thread group selection circuitry will select plural thread groups each having some inactive threads for issuing to the execution lanes for execution and/or a single thread group having some inactive threads to issue to the execution lanes for execution.

The Applicants have also recognised that there may be thread groups for which there are no inactive threads. In that case, such a thread group can simply be selected and issued on its own to the execution lanes for execution (as that thread group should then fully occupy all the execution lanes of the execution processing circuitry).

Equally, where a thread group with inactive threads is not able to be (potentially) combined with another thread group or groups, and/or so as to have two or more instructions executed for that thread group at the same time, such a thread group can simply be issued on its own to the execution lanes for execution (such that some of the execution lanes may then be inactive (and are in an embodiment disabled) for that thread group).

The operation in the manner of the present embodiments may be performed for any suitable and desired program and shader stage that is to be executed by the graphics processor, such as a geometry shader, a vertex shader, or a fragment shader. It can also be used for other data processors that execute programs in a similar manner.

It will be appreciated from the above that the technology described herein, in its embodiments at least, provides arrangements in which the throughput of thread groups through execution lanes can be increased relative to arrangements in which, for example, only a single thread group is issued to the execution lanes at any one time.

This is achieved, in the embodiments of the technology described herein at least, by maintaining a pool of thread groups available for execution and selecting thread groups for issuing to the execution lanes from the pool based on the active threads of the thread groups in the pool.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A data processor in which execution threads may execute program instructions to perform data processing operations and in which execution threads may be grouped together into thread groups in which the plural threads of a thread group can each execute a set of instructions in lockstep, one instruction at a time;

the data processor comprising:

execution processing circuitry operable to execute instructions to perform processing operations for execution threads executing a program to perform data processing operations, and comprising a set of at least one functional unit operable to perform data processing operations for an instruction being executed by an execution thread;

wherein:

the execution processing circuitry is operable as a plurality of execution lanes, each lane being operable to perform processing operations for a respective execution thread of a thread group;

the data processor further comprising:

thread group managing circuitry operable to maintain a pool of thread groups available to be issued to the execution lanes, and storing for each available thread group: an indication of a set of at least one next instruction to be executed by the thread group, and an indication of the active threads of the thread group;

and thread group selection circuitry operable to select thread groups from the pool of available thread groups and to issue the selected thread groups from the pool of available thread groups to the execution lanes for execution;

wherein:

the thread group selection circuitry is configured to select sets of at least one thread group to issue to the execution lanes for execution based on the indications of the active threads for the thread groups in the thread group pool;

wherein the thread group selection circuitry is operable to:

select a set of at least one thread group to issue to the execution lanes for execution that comprises duplicate copies of the active threads of a thread group;

and to:

issue the set of at least one thread group that comprises duplicate copies of the active threads of a thread group to the execution lanes for execution such that the execution lanes will execute a different instruction for each copy of the active threads of the thread group that is included in the set of at least one thread group that is issued to the execution lanes for execution.

2. The data processor of claim 1, comprising instruction decoding circuitry operable to decode an instruction for all of the execution lanes collectively, such that all the execution lanes will be provided with the same instruction for execution at any one time.

3. The data processor of claim 1, wherein:

the execution lanes are arranged as plural subsets of execution lanes;

and the data processor comprises instruction decoding circuitry operable to decode an instruction for each subset of the execution lanes, such that the execution lane subsets can be provided with different instructions for execution at the same time.

4. The data processor of claim 1, wherein the indication of a set of at least one next instruction to be executed by a thread group indicates a set of plural instructions to be executed next.

5. The data processor of claim 1, wherein the thread group managing circuitry also stores, for each thread group in the pool of the thread groups, one of more of: an identifier for the thread group, and an indication of data to be processed for each thread of the thread group.

6. The data processor of claim 1, wherein the thread group selection circuitry is operable to select both sets containing single thread groups and sets containing plural thread groups for issue to the execution lanes.

7. The data processor of claim 1, wherein the thread group selection circuitry is configured to select sets of at least one thread group to issue to the execution lanes for execution based on the indications of the active threads for the thread groups in the thread group pool and on the indications of a set of at least one next instruction to be executed for the thread groups in the thread group pool.

8. The data processor of claim 1, wherein the data processor is a graphics processor.

9. A method of operating a data processor in which execution threads may execute program instructions to perform data processing operations and in which execution threads may be grouped together into thread groups in which the plural threads of a thread group can each execute a set of instructions in lockstep, one instruction at a time;

the data processor comprising:

execution processing circuitry operable to execute instructions to perform processing operations for execution threads executing a program to perform data processing operations and comprising a set of at least one functional unit operable to perform data processing operations for an instruction being executed by an execution thread;

wherein:

the execution processing circuitry is operable as a plurality of execution lanes, each lane being operable to perform processing operations for a respective execution thread of a thread group;

the method comprising:

maintaining a pool of thread groups available to be issued to the execution lanes, and storing for each available thread group: an indication of a set of at least one next instruction to be executed by the thread group, and an indication of the active threads of the thread group;

selecting a set of at least one thread group to issue to the execution lanes for execution from the pool of available thread groups based on the indications of the active threads for the thread groups in the thread group pool;

and issuing the selected set of at least one thread group from the pool of available thread groups to the execution lanes for execution wherein:

selecting a set of at least one thread group to issue to the execution lanes for execution from the pool of available thread groups based on the indications of the active threads for the thread groups in the thread group pool;

and issuing the selected set of at least one thread group from the pool of available thread groups to the execution lanes for execution, comprises:

including plural copies of the active threads of the same thread group in a set of at least one thread group to issue to the execution lanes for execution;

and:

issuing the set of at least one thread group that comprises plural copies of the active threads of the same thread group to the execution lanes for execution such that the execution lanes will execute a different instruction for each copy of the active threads of the thread group that is included in the set of at least one thread group that is issued to the execution lanes for execution.

10. The method of claim 9, wherein the indication of a set of at least one next instruction to be executed by a thread group indicates a set of plural instructions to be executed next.

11. The method of claim 9, further comprising also storing, for each thread group in the pool of the thread groups, one or more of: an identifier for the thread group, and an indication of data to be processed for each thread of the thread group.

12. The method of claim 9, comprising selecting a set of at least one thread group to issue to the execution lanes for execution based on the indications of the active threads for the thread groups in the thread group pool and on the indications of a set of at least one next instruction to be executed for the thread groups in the thread group pool.

13. The method of claim 9, comprising selecting a set of plural thread groups that are each to execute the same next instruction for issue to the execution lanes for execution.

14. The method of claim 9, comprising selecting a set of plural thread groups that are to execute different next instructions for issue to the execution lanes for execution.

15. The method of claim 14, wherein:
the execution lanes are arranged as plural subsets of execution lanes;
and
the data processor comprises instruction decoding circuitry operable to decode an instruction for each subset of the execution lanes, such that the execution lane subsets can execute different instructions at the same time;
and
the method comprises:
issuing the active threads of each thread group of the set of plural thread groups that is to execute a different next instruction to a different execution lane subset.

16. The method of claim 9, wherein:
the execution lanes are arranged as plural subsets of execution lanes;
and
the data processor comprises instruction decoding circuitry operable to decode an instruction for each subset of the execution lanes, such that the execution lane subsets can execute different instructions at the same time;
and
the method comprises:
issuing each copy of the active threads of the same thread group in the set of at least one thread group to a different execution lane subset for execution.

17. The method of claim 9, comprising:
selecting a set of a single thread group to issue to the execution lanes for execution;
and
issuing the active threads for the thread group to a subset of the execution lanes in association with a first instruction to be executed for the thread group for execution;
and
also issuing the active threads of the thread group to a second subset of the execution lanes in association with a different instruction to be executed for the thread group for execution.

18. The method of claim 9, wherein the data processor is a graphics processor.

19. A non-transitory computer readable storage medium storing computer software code which when executing on a processor performs a method of operating a data processor in which execution threads may execute program instructions to perform data processing operations and in which execution threads may be grouped together into thread groups in which the plural threads of a thread group can each execute a set of instructions in lockstep, one instruction at a time;
the data processor comprising:
execution processing circuitry operable to execute instructions to perform processing operations for execution threads executing a program to perform data processing operations and comprising a set of at least one functional unit operable to perform data processing operations for an instruction being executed by an execution thread;
wherein:
the execution processing circuitry is operable as a plurality of execution lanes, each lane being operable to perform processing operations for a respective execution thread of a thread group;
the method comprising:
maintaining a pool of thread groups available to be issued to the execution lanes, and storing for each available thread group: an indication of a set of at least one next instruction to be executed by the thread group, and an indication of the active threads of the thread group;
selecting a set of at least one thread group to issue to the execution lanes for execution from the pool of available thread groups based on the indications of the active threads for the thread groups in the thread group pool;
and
issuing the selected set of at least one thread group from the pool of available thread groups to the execution lanes for execution;
wherein:
selecting a set of at least one thread group to issue to the execution lanes for execution from the pool of available thread groups based on the indications of the active threads for the thread groups in the thread group pool;
and
issuing the selected set of at least one thread group from the pool of available thread groups to the execution lanes for execution, comprises:
including plural copies of the active threads of the same thread group in a set of at least one thread group to issue to the execution lanes for execution;
and:
issuing the set of at least one thread group that comprises plural copies of the active threads of the same thread group to the execution lanes for execution such that the execution lanes will execute a different instruction for each copy of the active threads of the thread group that is included in the set of at least one thread group that is issued to the execution lanes for execution.

* * * * *